(12) United States Patent
Inagaki

(10) Patent No.: US 9,420,012 B2
(45) Date of Patent: Aug. 16, 2016

(54) COMPUTER READABLE RECORDING MEDIUM, COMMUNICATION TERMINAL DEVICE AND TELECONFERENCING METHOD

(71) Applicant: Brother Kogyo Kabushiki Kaisha, Nagoya-shi, Aichi-ken (JP)

(72) Inventor: Tomohiro Inagaki, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 1 day.

(21) Appl. No.: 14/555,761

(22) Filed: Nov. 28, 2014

(65) Prior Publication Data
US 2015/0156454 A1    Jun. 4, 2015

(30) Foreign Application Priority Data

Nov. 29, 2013    (JP) .................................. 2013-247159

(51) Int. Cl.
| | |
|---|---|
| *H04N 7/14* | (2006.01) |
| *H04L 29/06* | (2006.01) |
| *H04N 7/15* | (2006.01) |
| *H04M 3/56* | (2006.01) |
| *H04N 21/00* | (2011.01) |
| *H04L 12/18* | (2006.01) |

(52) U.S. Cl.
CPC .......... *H04L 65/1083* (2013.01); *H04L 65/403* (2013.01); *H04M 3/56* (2013.01); *H04N 7/152* (2013.01); *H04N 21/00* (2013.01); *H04L 12/18* (2013.01); *H04L 12/1822* (2013.01); *H04M 3/567* (2013.01)

(58) Field of Classification Search
CPC ......... H04N 7/15; H04N 7/147; H04N 7/141; H04N 2007/145; H04N 21/42203; H04N 21/4223; H04N 21/4318; H04N 5/2351; H04L 12/1813
See application file for complete search history.

(56) References Cited

U.S. PATENT DOCUMENTS

| | | | | |
|---|---|---|---|---|
| 5,430,473 | A | * 7/1995 | Beecher, II | ............ H04N 7/142 348/14.05 |
| 5,786,846 | A | * 7/1998 | Hiroaki | .................. H04N 7/142 348/14.16 |

(Continued)

FOREIGN PATENT DOCUMENTS

| | | |
|---|---|---|
| JP | H8-251561 A | 9/1996 |
| JP | 2009-81530 A | 4/2009 |

*Primary Examiner* — Stella L Woo
(74) *Attorney, Agent, or Firm* — Banner & Witcoff, Ltd.

(57) ABSTRACT

Image data corresponding to an image captured by a communication terminal device is transmitted from a communication unit of the communication terminal device which is connected to a network to a counter party device which is a counter party of the teleconference. An image display setting indicating whether the captured image is displayed in the counter party device is acquired, according to transmission of the image data. When it is determined that the captured image is in a first state, and the image display setting indicating that the captured image is displayed is acquired, notification information is output from a notification unit of the communication terminal device. When it is determined that the captured image is in a second state, and the image display setting indicating that the captured image is not displayed is acquired, notification information is not output from the notification unit.

15 Claims, 11 Drawing Sheets

(56) References Cited

U.S. PATENT DOCUMENTS

| | | | | |
|---|---|---|---|---|
| 7,148,917 B2* | 12/2006 | Klapman | ................ | H04N 5/232 348/14.16 |
| 7,379,968 B2* | 5/2008 | Schuh | ................ | H04L 12/1813 348/14.08 |
| 8,405,706 B2* | 3/2013 | Zhang | ................ | H04N 7/147 348/14.07 |
| 2012/0320142 A1* | 12/2012 | Baird | ................ | 348/14.03 |
| 2014/0049593 A1* | 2/2014 | Pai | ................ | H04N 7/147 348/14.01 |
| 2014/0359476 A1* | 12/2014 | Wakeford | ................ | A63F 13/85 715/748 |
| 2015/0049156 A1* | 2/2015 | Jouret | ................ | H04N 5/21 348/14.01 |
| 2015/0085064 A1* | 3/2015 | Sanaullah | ................ | H04M 3/568 348/14.08 |

* cited by examiner

COMPUTER READABLE RECORDING MEDIUM, COMMUNICATION TERMINAL DEVICE AND TELECONFERENCING METHOD

CROSS REFERENCE TO RELATED APPLICATION

This application is based upon and claims the benefit of priority of Japanese Patent Application No. 2013-247159 filed on Nov. 29, 2013, the contents of which are incorporated herein by reference in its entirety.

BACKGROUND

The present disclosure relates to a computer-executable program, a communication terminal device, and a teleconferencing method for controlling a communication terminal device used in teleconferencing through a network.

Technologies related to teleconferencing have been proposed recently. For example, a user interface of a video communication device through which a user talks with a counter party at a remote site which also exchanges images has been proposed. The user interface outputs position information by detecting the position, the attitude and the like of a terminal user who is an object of a camera unit. It is determined whether the terminal user is out of the field of view of the camera unit based on the position information, and when the terminal user is out of the range, the user is notified that he/she is out of range.

SUMMARY

A teleconference is performed by transmitting respective pieces of data for images and sounds which are obtained from a communication terminal device and at least one or more counter party devices respectively thereto. For example, captured images corresponding to image data transmitted from the communication terminal device are displayed on the counter party device, and sounds corresponding to sound data transmitted from the communication terminal device are output by the counter party device. Further, captured images corresponding to image data transmitted from the counter party device are displayed on the communication terminal device, and sounds corresponding to sound data transmitted from the counter party device are output by the communication terminal device.

However, depending on the form of the teleconference, a captured image from a first party is displayed on a second party, but a captured image from the second party is not displayed on the first party in some cases. For example, it is assumed that such a teleconference is a conference as a lecture or a presentation, and a communication terminal device is that of a presenter, and a counter party device is that of a viewer. In this case, it is assumed that the captured image corresponding to captured data from the communication terminal device is displayed on the counter party device, but the captured image corresponding to captured data from the counter party device is rarely displayed on the communication terminal device. In other words, it is considered that since the interest of a viewer is primarily directed to the presenter in the teleconference as a lecture or a presentation, it is desirable that the presenter be included in the captured image of the presenter in a preferred state.

The inventors of the present invention have studied a technology in which if the image data corresponding to the captured image in the preferred state is not transmitted to the counter party device, the communication terminal device is notified of that fact and induced to be in a preferred state. At that time, the inventors concentrated on ensuring that unnecessary notification is not performed. In the example described above, the interest of the viewer is not directed to the presenter but is directed to the contents to be presented, and the interest of the viewer in the presenter is lower than that toward the contents to be presented in some cases. In such a case, if the notification described above is performed in the communication terminal device of the presenter, it is assumed that the concentration of the presenter is diverted to the notification, and therefore, smooth presentation is difficult.

An object of the present disclosure is to provide a non-transitory computer readable recording medium storing a program, a communication terminal device and a teleconferencing method by which smooth a teleconference can be realized.

An aspect of the present disclosure provides the following arrangements:

A non-transitory computer readable recording medium storing a computer-executable program, when executed by a computer of a communication terminal device which is used for teleconferencing through a network and includes an imaging unit, a communication unit and a notification unit, causing the communication terminal device to execute:

a transmission control instruction of transmitting image data from the communication unit of the communication terminal device to a counter party device, the image data corresponding to an image captured by the camera of the communication terminal device, the communication unit being connected to the network, the counter party device participating in the teleconference;

a first acquisition instruction of acquiring an image display setting indicating whether the captured image is displayed by the counter party device according to transmission of the image data by the transmission control instruction; and a determination instruction of determining whether a state of the captured image is in a first state or a second state;

an output control instruction of:

outputting notification information from the notification unit of the communication terminal device in a first case in which the determination instruction determines that the captured image is in the first state and the first acquisition instruction acquires the image display setting indicating that the captured image is displayed; and not outputting the notification information from the notification unit in a second case in which the determination instruction determines that the captured image is in the second state and the first acquisition instruction acquires the image display setting indicating that the captured image is not displayed.

A communication terminal device used for teleconference through a network, comprising:

a processor; and memory storing a computer readable recording medium storing a program, when executed by the processor, causing the communication terminal device to execute:

a transmission control instruction of transmitting image data from the communication unit of the communication terminal device to a counter party device, the image data corresponding to an image captured by the camera of the communication terminal device, the communication unit being connected to the network, the counter party device participating in the teleconference;

a first acquisition instruction of acquiring an image display setting indicating whether the captured image is displayed by the counter party device according to transmission of the image data by the transmission control instruction; and a determination instruction of determining whether a state of the captured image is in a first state or a second state;

an output control instruction of:

outputting notification information from the notification unit of the communication terminal device in a first case in which the determination instruction determines that the captured image is in the first state and the first acquisition instruction acquires the image display setting indicating that the captured image is displayed; and not outputting the notification information from the notification unit in a second case in which the determination instruction determines that the captured image is in the second state and the first acquisition instruction acquires the image display setting indicating that the captured image is not displayed.

A teleconferencing method executed in a communication terminal device used for teleconference through a network, comprising:

transmitting image data from the communication unit to a counter party device, the image data corresponding to an image captured by the camera of the communication terminal device, the communication unit being connected to the network, the counter party device participating in the teleconference;

acquiring an image display setting indicating whether the captured image is displayed by the counter party device according to the transmission of the image data; and determining whether a state of the captured image is in a first state or a second state;

outputting notification information from the notification unit of the communication terminal device in a first case in which the it is determined that the captured image is in a first state and the image display setting indicating that the captured image is displayed is acquired; and not outputting the notification information from the notification unit in a second case in which it is determined that the captured image is in a second state and the image display setting indicating that the captured image is not displayed is acquired.

DESCRIPTION OF ILLUSTRATIVE EMBODIMENTS

Illustrative embodiments according to the present disclosure will be described with reference to drawings. The present invention is not limited to the following configuration, and it is possible to adopt various configurations in the same technical spirit. For example, some of configurations shown below may be omitted or replaced with other configurations, or may include other configurations.

<Teleconference System>

Figure 1:
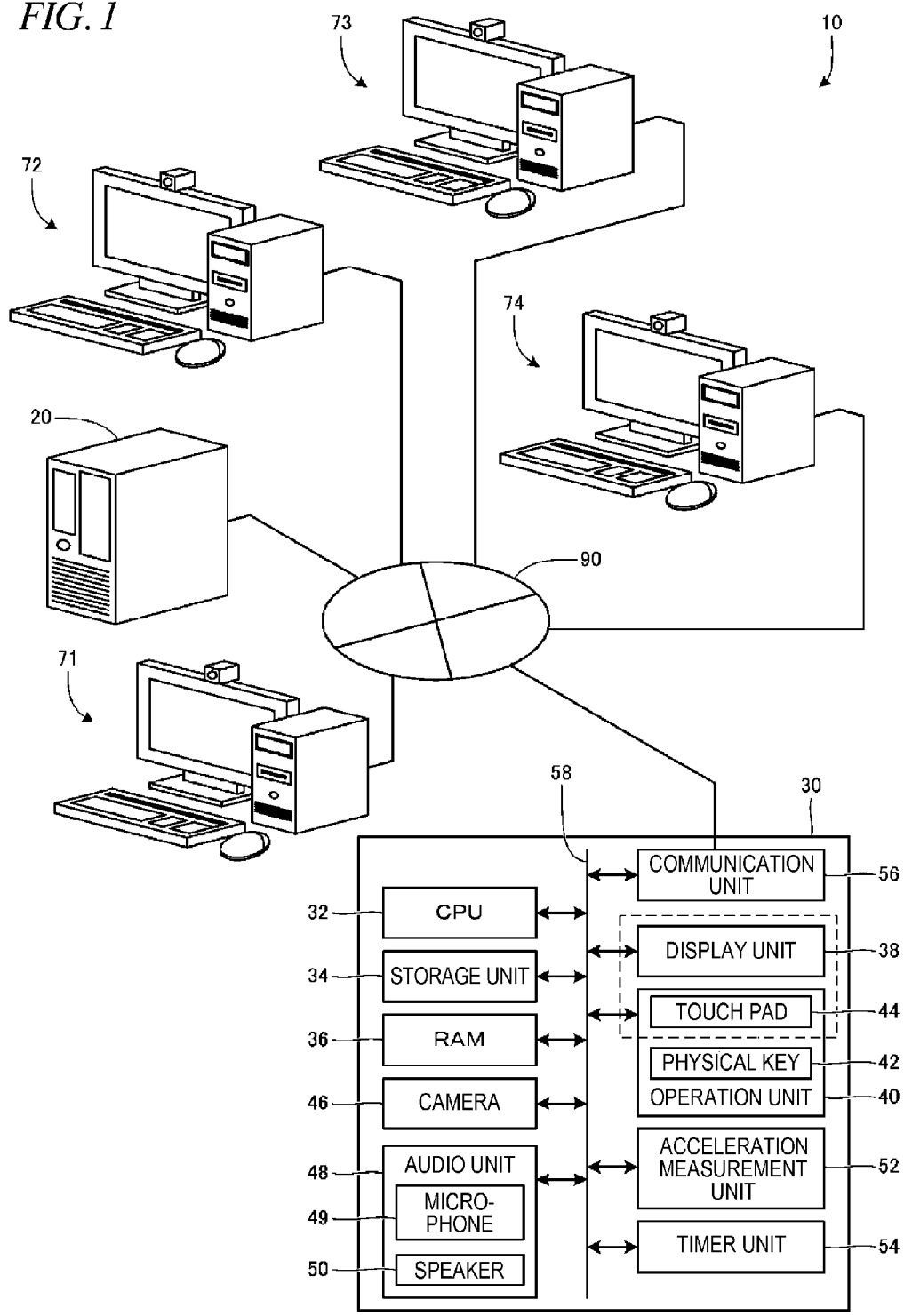
FIG. 1 is a diagram illustrating an example of a teleconference system.
Figure 2:
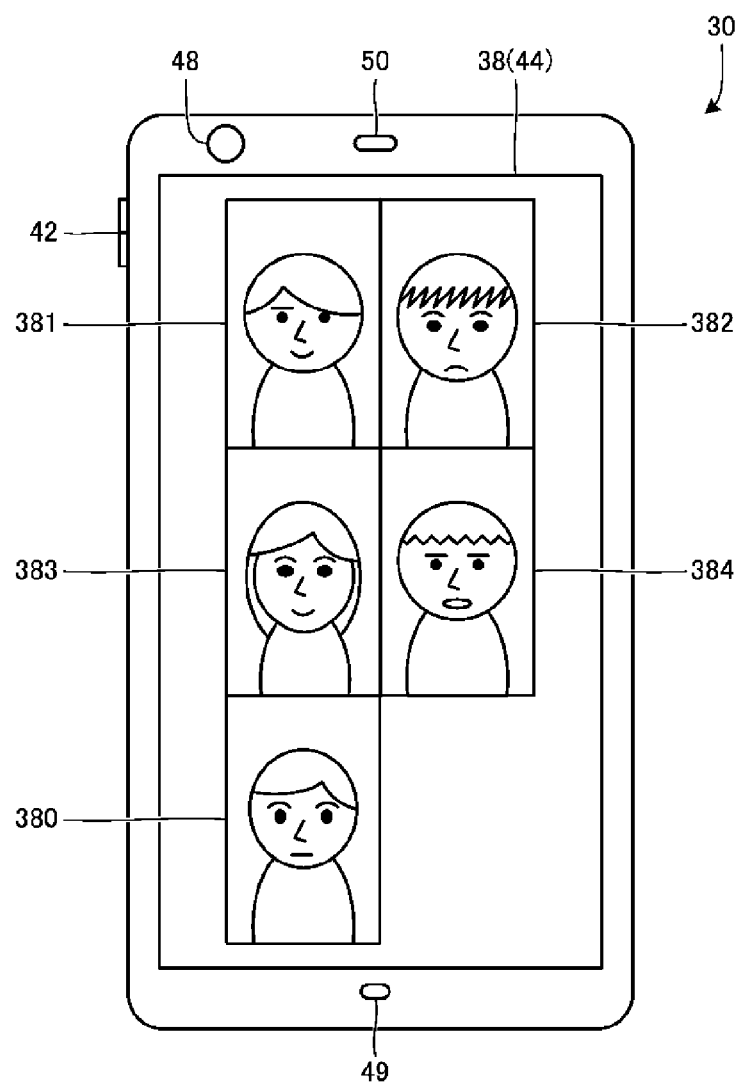
FIG. 2 is a diagram illustrating an example of a teleconference screen displayed on a communication terminal device, in which an image captured by the communication terminal device is displayed.

A teleconference system 10 will be described briefly with reference to FIGS. 1 and 2. As illustrated in FIG. 1, the teleconference system 10 includes a server device 20, a communication terminal device 30, and four counter party devices 71, 72, 73, and 74. A teleconference which is performed by the communication terminal device 30 and four counter party devices 71, 72, 73, and 74 will be described as an example below. The teleconference using the teleconference system 10 may be performed by the communication terminal device 30 and one to three counter party devices, or the communication terminal device 30 and five or more counter party devices.

The server device 20, the communication terminal device 30, and the counter party devices 71, 72, 73, and 74 are connected through a network 90. The network 90 is, for example, a network such as the Internet. The teleconference using the communication terminal device 30 and the counter party devices 71, 72, 73, and 74 is performed through the server device 20, similarly to a known teleconference system. The server device 20 is the same server device as a server device in the known teleconference system. Accordingly, a detailed description of the hardware configuration of the server device 20 and the processes executed in the server device 20 are omitted. The teleconference using the teleconference system 10 may be performed in such a manner that the communication terminal device 30 and the counter party devices 71, 72, 73, and 74 directly communicate through the network 90. In such a P2P type teleconference, the server device 20 is omitted.

The communication terminal device 30 is a communication device having a communication function through the network 90. The communication terminal device 30 is, for example, a communication device such as a smart phone, a tablet terminal or a personal computer. A case in which the communication terminal device 30 is a mobile type communication device such as a smart phone and a tablet terminal will be described as an example below. The configuration of the communication terminal device 30 will be described later. The counter party devices 71, 72, 73, and 74 are known communication devices such as personal computers. Some or all of the counter party devices 71, 72, 73, and 74 may be the same communication device as the communication terminal device 30. During the teleconference, respective processes (see FIGS. 4 to 9 and 11) performed in the communication terminal device 30 to be described later are also performed in the counter party devices 71, 72, 73, and 74. The name of "counter party device" is given simply in order to distinguish the communication terminal device 30, in an embodiment in which the communication terminal device 30 is mainly described. The description regarding the counter party devices 71, 72, 73, and 74 will be appropriately omitted.

In the teleconference system 10, image data corresponding to an image captured in the communication terminal device 30 and sound data corresponding to sound collected in the communication terminal device 30 are transmitted from the communication terminal device 30 to the server device 20. Further, image data corresponding to an image captured by the counter party device 71 and sound data corresponding to sound collected in the counter party device 71 are transmitted from the counter party device 71 to the server device 20. Even in the counter party devices 72, 73, 74, similarly to the counter party device 71, image data corresponding to each of the captured images and sound data corresponding to each of collected sounds are respectively transmitted to the server device 20. The captured images may be still images or moving images. That is, the image data may be data of still images or video data. The server device 20 which has acquired the image data and the sound data transmitted from the communication terminal device 30 and the counter party devices 71, 72, 73, and 74 transmits the acquired image data and sound data respectively to the communication terminal device 30 and the counter party devices 71, 72, 73, and 74 other than a source device. For example, the server device 20 transmits the image data and sound data which have been transmitted from the communication terminal device 30, respectively to the counter party devices 71, 72, 73, and 74 other than the communication terminal device 30. In other words, in the teleconference system 10, the image data and sound data which have been transmitted from the communication terminal device 30 are transmitted respectively to the counter party devices 71, 72, 73, 74 through the server device 20 in a streaming manner, and the image data and sound data which have been transmitted from the counter party devices 71, 72, 73, 74 are respectively transmitted to the communication terminal device 30 through the server device 20 in a streaming manner.

Identification information of the transmission source device in addition to the image data and the sound data are transmitted from the communication terminal device 30 and the counter party devices 71, 72, 73, and 74. The server device 20 transmits the identification information of the transmission source device in addition to the image data and the sound data which are transmitted to the communication device other than the transmission source device. The identification information may be included in, for example, respective header portions of the image data and the sound data. The identification information is information for identifying each communication device (e.g., IP address, MAC address, user name, or user ID). For example, the identification information of the communication terminal device 30 is information for identifying the communication terminal device 30, and the identification information of each of the counter party devices 71, 72, 73, and 74 is information for identifying each of the counter party devices 71, 72, 73, and 74.

The communication terminal device 30 receives and acquires the image data, the sound data, and the identification information from the counter party devices 71, 72, 73, and 74. In the communication terminal device 30, respective pieces of image data transmitted from the counter party devices 71, 72, 73, and 74 are played, and a teleconference screen in which captured images 381, 382, 383, and 384 corresponding to respective pieces of image data are arranged in predetermined positions is displayed (see FIG. 2). In the communication terminal device 30, image data acquired in its own device is played, and the captured image 380 corresponding to the image data and the captured images 381, 382, 383, and 384 are displayed in a state of being arranged in predetermined positions (see FIG. 2). In addition, the server device 20 transmits the image data which has been transmitted from the source device, to the source device, and the transmission source device of the image data may perform the display of the captured image of its own device based on the image data which has been transmitted from the server device 20 and received and acquired in its own device. In this case, for example, the display of the captured image 380 in the communication terminal device 30 is performed by playing the image data of its own device transmitted from the server device 20. In the embodiment, it is assumed that the image data of its own device is played in its own device without passing through the server device 20.

Figure 3:
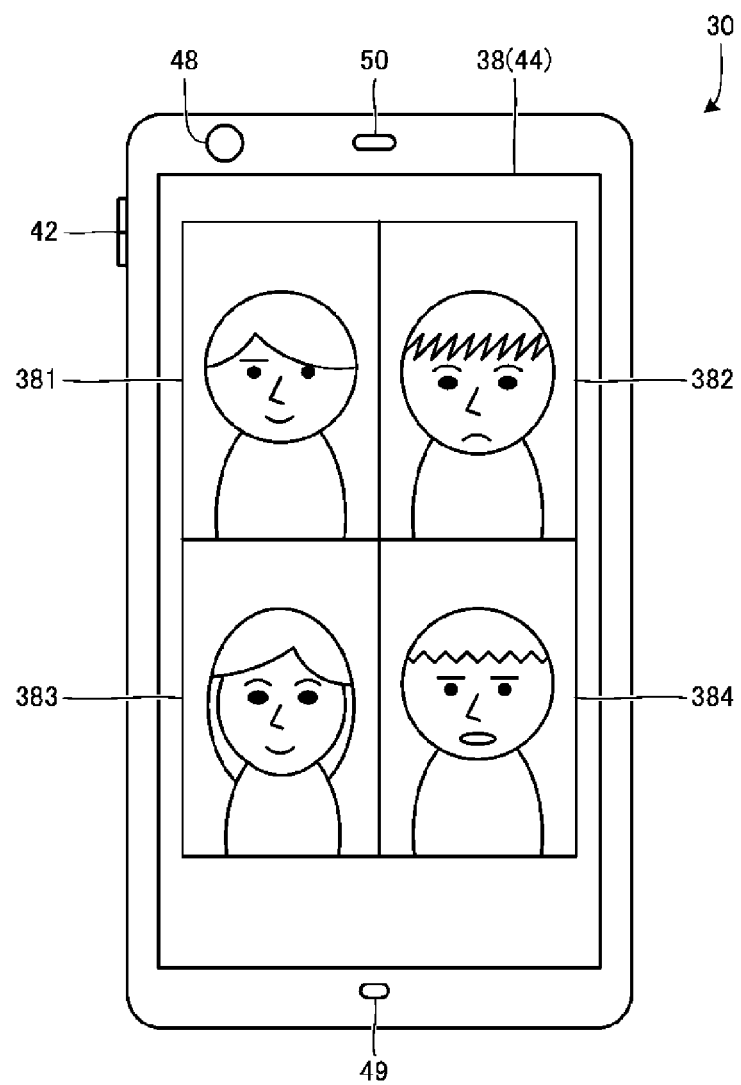
FIG. 3 is a diagram illustrating an example of a teleconference screen displayed on the communication terminal device, in which the image captured by the communication terminal device is not displayed.

However, in the communication terminal device 30, some of the captured images 380, 381, 382, 383, and 384 may be set not to be displayed. The communication terminal device 30 can receive the setting of whether to display the captured images 380, 381, 382, 383, and 384 through an operation unit 40 which will be described later. The display is performed according to the setting in the communication terminal device 30. For example, the captured image 380 may be set not to be displayed, and the captured images 381, 382, 383, and 384 may be set to be displayed. In this case, a teleconference screen in which the captured image 380 is not displayed and the captured images 381, 382, 383, and 384 are arranged in predetermined positions is displayed (see FIG. 3). In the communication terminal device 30, it is possible to change the respective display sizes of the displayed captured images among the captured images 380, 381, 382, 383, and 384. In the communication terminal device 30, respective pieces of sound data transmitted from the counter party devices 71, 72, 73, and 74 are played and sounds corresponding to respective pieces of sound data are output.

The captured image 381 is a captured image corresponding to the image data from the counter party device 71. The captured image 382 is a captured image corresponding to the image data from the counter party device 72. The captured image 383 is a captured image corresponding to the image data from the counter party device 73. The captured image 384 is a captured image corresponding to the image data from the counter party device 74.

Also in the counter party devices 71, 72, 73, and 74, respective pieces of image data from the communication devices other than the devices themselves among the communication terminal device 30 and the counter party devices 71, 72, 73, and 74 are played, and a teleconference screen in which captured images corresponding to respective pieces of image data are appropriately arranged is displayed. At this time, the counter party devices 71, 72, 73, and 74 can play the image data acquired by the device themselves and can display the captured image in the device themselves. However, also in the counter party devices 71, 72, 73, and 74, similarly to the communication terminal device 30, it is possible to set any of the captured images 380, 381, 382, 383, and 384 not to be displayed. For example, it is possible to set the captured image 380 not to be displayed. Further, also in the counter party devices 71, 72, 73, and 74, similarly to the communication terminal device 30, it is possible to change respective display sizes of the displayed captured images. For example, it is possible to enlarge or reduce the display size of the captured image 380 to a predetermined size, with the captured image 380 being displayed in the display size which has been set.

Also in the counter party devices 71, 72, 73, and 74, the sound data from the communication terminal device 30 and sound data from the communication devices other than its own device among the counter party devices 71, 72, 73, and 74 are played and the sounds corresponding to respective pieces of sound data are output.

<Communication Terminal Device>

As illustrated in FIG. 1, the communication terminal device 30 includes a CPU 32, a storage unit 34, a RAM 36, a display unit 38, an operation unit 40, a camera 46, an audio unit 48, an acceleration measurement unit 52, a timer unit 54, and a communication unit 56. The respective units 32 to 56 are connected to a bus 58.

The CPU 32 executes a calculation process. The storage unit 34 is configured with a computer-readable recording medium, for example, a flash memory. However, the storage unit 34 may be configured with a hard disc and/or a ROM. Various programs are stored in the storage unit 34. For example, an operating system (OS) and various applications are stored in the storage unit 34. The application stored in the storage unit 34 includes a program for executing each process which will be described later (see FIGS. 4 to 9 and 11). The program for executing each process which will be described later may be installed in advance in the storage unit 34, but when the communication terminal device 30 accesses the server device 20 in order to attend the teleconference, the program may be transmitted as a transmission signal to the communication terminal device 30 from the server device 20 through the network 90, and installed in the storage unit 34 at that timing. In this case, the program may be stored in the RAM 36.

Pre-installation is performed, for example, by a reading unit (not shown) of the communication terminal device 30 reading a program stored in the computer-readable recording medium such as a semiconductor memory. When the communication terminal device 30 includes, for example, an optical drive (not shown) as a personal computer, the pre-installation may be performed by the optical drive reading the program stored in the optical media. In addition, the pre-installation may be performed by receiving a program stored in a computer-readable recording medium such as a hard disc of a server device (server device 20 or a server device which is not shown) connected to the communication terminal device 30 through the network 90 through the communication unit 56 of the communication terminal device 30 as a transmission signal. The selection of a pre-installation type is appropriately determined considering various circumstances. In addition, the computer-readable recording medium may not include signals which are transmitted transiently. The computer-readable recording medium may be a non-transitory storage medium. The non-transitory storage medium does not include a transitory signal. The non-transitory storage medium may be a recording medium capable of storing information, regardless of the period for storing information.

The RAM 36 is a storage area to be used when the CPU 32 executes various programs. During the execution of the process, predetermined data and information which are used in the process are stored in a predetermined storage area of the RAM 36.

In the communication terminal device 30, the CPU 32 executes the OS stored in the storage unit 34 and programs of respective processes illustrated in FIGS. 4 to 9 and 11 so as to control the communication terminal device 30. Thus, in the communication terminal device 30, various processed are executed, and various types of functional means are realized.

The display unit 38 displays various types of information. The display unit 38 is, for example, a known display device such as a liquid crystal display (LCD) or an organic electro luminescence (EL). For example, the display unit 38 displays the teleconference screen (see FIGS. 2 and 3). The operation unit 40 receives various inputs such as various instructions for the communication terminal device 30. The operation unit 40 includes, for example, a physical key 42 and a touch pad 44. The touch pad 44 is, for example, a capacitance type position input device, and outputs a signal indicating a coordinate position corresponding to a contact position of the user's finger. The touch pad 44 may be configured with position input devices of other types such as a resistive film type position input device or an ultrasonic type position input device. A touch panel (see a dash line surrounding "the display unit 38" and "the touch pad 44" in FIG. 1) is realized with the display unit 38 and the touch pad 44.

The user of the communication terminal device 30 performs operations such as a swipe, flick, tap, drag, and pinch-in and pinch-out on the touch pad 44. The user of the communication terminal device 30 performs each operation described above by moving the finger in contact with the touch pad 44 in a predetermined direction. Each operation is a technology which is adopted also in known smart phones or tablet terminals, and is adopted also in the communication terminal device 30. The operation unit 40 may be configured by combining a keyboard and a mouse. In addition, when the communication terminal device 30 is a personal computer, the operation unit 40 includes a keyboard and a mouse.

The camera 46 captures an outside image in front of the communication terminal device 30. For example, when the user of the communication terminal device 30 is located in front of the communication terminal device 30, the camera 46 captures the outside image including the user. The audio unit 48 includes a microphone 49 and a speaker 50. The microphone 49 collects outside sound. For example, the microphone 49 collects the sound that the user of the communication terminal device 30 makes. The speaker 50 outputs the sound. The audio unit 48 generates waveform data obtained by A/D converting the sound collected in the microphone 49 at a predetermined sampling frequency (for example, 11.025 kHz or 44.1 kHz). Further, the audio unit 48 outputs the sound corresponding to the sound data from the speaker 50. In the communication terminal device 30, the capturing by the camera 46 and the collecting of sounds by the microphone 49 are started at the start of the teleconference, and image data corresponding to an image captured in the camera 46 and sound data corresponding to sounds collected in the microphone 49 (waveform data which is A/D converted at a predetermined sampling frequency) are generated. The acceleration measurement unit 52 measures acceleration of the communication terminal device 30. The acceleration measurement unit 52 is configured with, for example, a known three-axis acceleration sensor of a piezo-resistive type, a capacitive type, and a thermal detection type. The timer unit 54 has a calendar function and a clock function, and measures the passage of time. The timer unit 54 may be configured with a clock function that the OS has.

The communication unit 56 connects the communication terminal device 30 to the network 90, and performs data communication through the network 90. For example, each of the image data and the sound data which are generated at the start of the teleconference and the identification information of the communication terminal device 30 are transmitted to the counter party devices 71, 72, 73, and 74 from the communication unit 56 through the server device 20. In the communication unit 56, the image data and the sound data from each of the counter party devices 71, 72, 73, and 74, which are transmitted through the server device 20, and the identification information of the transmission source device are received. The connection to the network 90 by the communication unit 56 may be either wireless connection or hardwired connection. For example, when the communication terminal device 30 is a mobile-type communication device, the connection to the network 90 by the communication unit 56 is wireless connection. The communication unit 56 is a communication module for performing wireless communication, for example, according to a known communication scheme such as a Wi-Fi standard, a 4G standard, and a 3G standard.

The communication terminal device 30 is different from the known mobile-type device in that the communication terminal device 30 stores the program of each process which will be described later in the storage unit 34. However, the communication terminal device 30 is the same communication device as the known mobile-type device in the hardware. The communication terminal device 30 includes a gyro sensor in addition to the respective units described above. According to the gyro sensor, it is possible to measure, for example, an angular acceleration and an inclination of the communication terminal device 30.

<Main Process>

Figure 4:
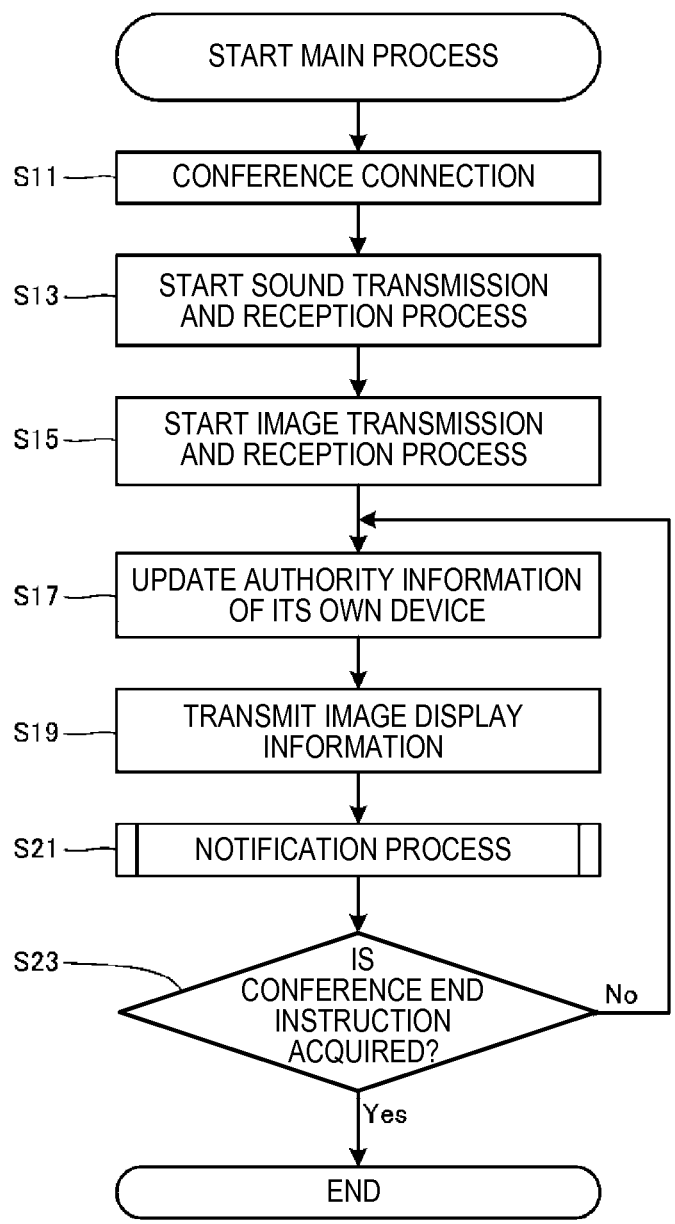
FIG. 4 is a flowchart of a main process.

In a teleconference with the counter party devices 71, 72, 73, and 74 through the server device 20, the main process performed by the communication terminal device 30 will be described with reference to FIG. 4. In the teleconference system 10, for example, before a scheduled date and time of the teleconference, an e-mail is transmitted from the server device 20, and each e-mail address corresponds to each of the communication terminal device 30 and the counter party devices 71, 72, 73, and 74 which are scheduled to attend the teleconference as a destination. The e-mail includes a uniform resource locator (URL) for the teleconference using the communication terminal device 30 and the counter party devices 71, 72, 73, and 74. The URL is specific for each conference room of the teleconference. In other words, the URL includes the ID of the teleconference.

Further, the URL includes authority information of the teleconference which is set for each of the communication terminal device 30 and the counter party devices 71, 72, 73, and 74. The authority which is set in the teleconference includes, for example, organizer authority, presenter authority and viewer authority. The organizer authority is the highest authority, and can perform all the functions available in the teleconference system 10. The presenter authority is the next highest authority to the organizer authority, and the execution of some of the functions available in the teleconference system 10 is limited. The viewer authority is the lowest authority among the three illustrated authorities, and the execution of more functions than those in the presenter authority is limited. That is, the authority information can be recognized as indicating a degree of functions available in the teleconference. In the embodiment, the organizer authority, the presenter authority and the viewer authority will be described as an example.

For example, it is assumed that the user who operates the counter party device 71 applies for the use of the teleconference, and at this time, an offer of setting is performed in which the communication terminal device 30 is set to the presenter authority, the counter party device 71 is set to the organizer authority, the counter party device 72 is set to the presenter authority, and the counter party devices 73, and 74 are set to the viewer authority. In this case, the URL transmitted to the communication terminal device 30 includes the authority information indicating the presenter authority in a predetermined portion of the URL. The URL transmitted to the counter party device 71 includes the authority information indicating the organizer authority in a predetermined portion of the URL. The URL transmitted to the counter party device 72 includes the authority information indicating the presenter authority in a predetermined portion of the URL. The URL transmitted to the counter party devices 73 and 74 includes the authority information indicating the viewer authority in a predetermined portion of the URL. In addition, the conference ID and the authority information may not be included as, for example, the query parameters of the URL.

The organizer authority includes a function of changing the preset authority during the teleconference. Based on the examples described above, the counter party device 71 of the organizer authority can set again the authority of the communication terminal device 30 which has been set to the presenter authority, as the organizer authority or the viewer authority.

The user of the communication terminal device 30 operates the communication terminal device 30 on the scheduled date and time of the teleconference. In the communication terminal device 30, the CPU 32 accesses the server device 20 from the communication unit 56, based on the URL including the conference ID and the authority information which are described above, and executes the process for conference connection (S11). By the process in S11, a session as a teleconference is established between the communication terminal device 30 and the server device 20, and the communication terminal device 30 is connected to the server device 20 for the conference. The same operation is performed also in the counter party devices 71, 72, 73, and 74, a session as a teleconference is established between each of the counter party devices 71, 72, 73, and 74 and the server device 20, and the counter party devices 71, 72, 73, and 74 are connected to the server device 20.

The server device 20 stores the conference ID included in the URL in association with the identification information of each of the communication terminal device 30 and the counter party devices 71, 72, 73, and 74. At this time, while opening the teleconference, the server device 20 specifies authority that has been set in each communication device, according to URL used by each of the communication terminal device 30 and the counter party devices 71, 72, 73, and 74 for access to the server device 20, and stores each specified authority in association with the identification information of each communication device. The teleconference by the communication terminal device 30 and the counter party devices 71, 72, 73, and 74 is opened in such a manner.

After performing S11, the CPU 32 starts a sound transmission and reception process (S13). After performing S13, the CPU 32 starts an image transmission and reception process (S15). In addition, the image transmission and reception process may be started in S13, and the sound transmission and reception process may be started in S15. The sound transmission and reception process and the image transmission and reception process will be described.

After starting the sound transmission and reception process and the image transmission and reception process, the CPU 32 updates authority information (S17). The CPU 32 outputs a transmission instruction of an authority information request for requesting authority information to the communication unit 56 in S17. Accordingly, the authority information request is transmitted from the communication unit 56 to the server device 20. The authority information request includes identification information of the communication terminal device 30. The server device 20 that has acquired the authority information request transmits the authority information indicating the authority of the communication terminal device 30 specified by the identification information, according to the identification information included in the authority information request, to the communication terminal device 30 which is the request source. In the communication terminal device 30, the authority information from the server device 20 is received by the communication unit 56. The CPU 32 acquires the authority information through the communication unit 56. For example, when the presenter authority is set for the communication terminal device 30, the CPU 32 acquires authority information "presenter authority". The CPU 32 stores the authority information in the RAM 36. When the authority information is stored in the RAM 36 in S17 that is previously performed, the CPU 32 sets the stored authority information as newly acquired authority information.

Subsequently, the CPU 32 controls the transmission of the image display information (S19). In S19, the CPU 32 outputs the transmission instruction of the image display information to the communication unit 56. Accordingly, the image display information is transmitted to the server device 20 through the communication unit 56. The image display information is information regarding the display of the captured image corresponding to image data from the communication devices other than its own device. The communication devices other than its own device are, for example, the counter party devices 71, 72, 73, and 74, with the communication terminal device 30 as a reference. In S19, the image display information transmitted to the server device 20 from the communication unit 56 includes, for example, information indicating whether each of the captured images 381, 382, 383, and 384 is displayed or not displayed on the teleconference screen (see FIGS. 2 and 3), and the display sizes of the displayed captured images among the captured images 381, 382, 383, and 384. Further, the image display information includes the identification information of the communication terminal device 30 as the identification information of the source device.

The information indicating whether each of the captured images 381, 382, 383, and 384 is displayed or not displayed and the display size of the captured images 381, 382, 383, and 384 may be used together. For example, the display size "horizontal×vertical: X×Y pixel" (X, Y>0) indicates that the captured image is being displayed. The display size "horizontal×vertical: 0×0 pixel" indicates that the captured image is not displayed. The format of the information indicating either display or non-display is appropriately determined considering various conditions. The image display information to be transmitted in S19 is stored in the RAM 36 in S65 of the image transmission and reception process which is started in S15 (see FIG. 6).

Next, the CPU 32 performs a notification process (S21). The notification process will be described later. After performing the notification process, the CPU 32 determines whether a conference end instruction is acquired (S23). The conference end instruction is input by the user of the communication terminal device 30 operating the operation unit 40. The CPU 32 acquires the conference end instruction in response to the user operation. When the conference end instruction is not acquired (S23: No), the CPU 32 returns the process to S17, and performs the process of S17 and the subsequent processes. When the conference end instruction is acquired (S23: Yes), the CPU 32 performs a process of disconnecting the connection with the server device 20 for the conference and ends the main process.

<Sound Transmission and Reception Process>

The sound transmission and reception process which is started in S13 of the main process illustrated in FIG. 4 will be described with reference to FIG. 5. The CPU 32 that starts the sound transmission and reception process acquires sound collected in the microphone 49 (S31). In addition, conceptually, the sound acquired by the CPU 32 in S31 includes waveform data obtained by A/D converting the sound collected in the microphone 49 at a predetermined sampling frequency (for example, 11.025 kHz or 44.1 kHz) as described above. Subsequently, the CPU 32 detects the volume level of the acquired sound (dB), and determines whether the volume level of the acquired sound is a predetermined seventh threshold or more. The detection of volume level is determined, for example, by detecting the level of the waveform of the sound acquired in S31. In addition, since the sound acquired in S31 includes a plurality of sampling points, for example, an average level of the plurality of sampling points included within a predetermined time is detected as the volume level of sound. The maximum level of the plurality of sampling points may also be detected as the volume level of sound. The seventh threshold is determined in advance considering the volume level of the sound of the case in which it can be determined that the user of the communication terminal device 30 makes a sound in a teleconference. The seventh threshold is stored in the storage unit 34 in association with the program of the sound transmission and reception process. The seventh threshold may appropriately be changed, for example, according to the background noise level or the like.

When the volume level of the acquired sound is equal to or higher than the seventh threshold (S33: Yes), the CPU 32 generates sound data corresponding to the acquired sound (S35). For example, the CPU 32 encodes the sound acquired in S31 according to a predetermined format (for example, a known compression format such as G.711 or OPUS). In S35, the CPU 32 controls the transmission of the generated sound data. The CPU 32 outputs a transmission instruction of the sound data to the communication unit 56. Accordingly, the generated sound data is transmitted to the counter party devices 71, 72, 73, and 74 from the communication unit 56 through the server device 20. The sound data includes identification information of the communication terminal device 30. The server device 20 transmits the sound data from the communication terminal device 30 to the counter party devices 71, 72, 73, and 74 having the identification information different from the identification information included in the sound data. Thereafter, the CPU 32 moves the process to S37. When the volume level of the acquired sound is less than the seventh threshold (S33: No), the CPU 32 moves the process to S37.

In S37, the CPU 32 updates a speaking state. The speaking state is stored in the RAM 36. For example, when S37 is performed after S35 is performed, the CPU 32 sets the speaking state to "speaking". When S37 is performed after S33 is negative (S33: No), the CPU 32 sets the speaking state to "watching". When the speaking state is stored in the RAM 36 in S37 which is previously performed, the CPU 32 sets the stored speaking state to "speaking" or "watching" based on the current result of S33.

Next, the CPU 32 determines whether sound data from any of the counter party devices 71, 72, 73, and 74 is acquired (S39). Sound data from each of the counter party devices 71, 72, 73, and 74 is transmitted from each of the counter party devices 71, 72, 73, and 74 through the server device 20, as described above, and is received in the communication unit 56. The CPU 32 acquires sound data from any of the counter party devices 71, 72, 73, and 74 through the communication unit 56.

When the sound data is acquired (S39: Yes), the CPU 32 plays the acquired sound data, and controls the output of the played sound (S41). The CPU 32 decodes the acquired sound data according to a predetermined format, and outputs an output instruction of a sound acquired by decoding to the audio unit 48. In the audio unit 48, the sound corresponding to the sound data is output from the speaker 50 in response to an output instruction. When the sound data is not received and the sound data is not acquired in the communication unit 56 (S39: No) or after S41 is performed, the CPU 32 returns the process to S31, and performs the process of S31 and the subsequent processes. The sound transmission and reception process is continuously performed until the conference connection with the server device 20 is disconnected.

<Video Transmission and Reception Process>

Figure 6:
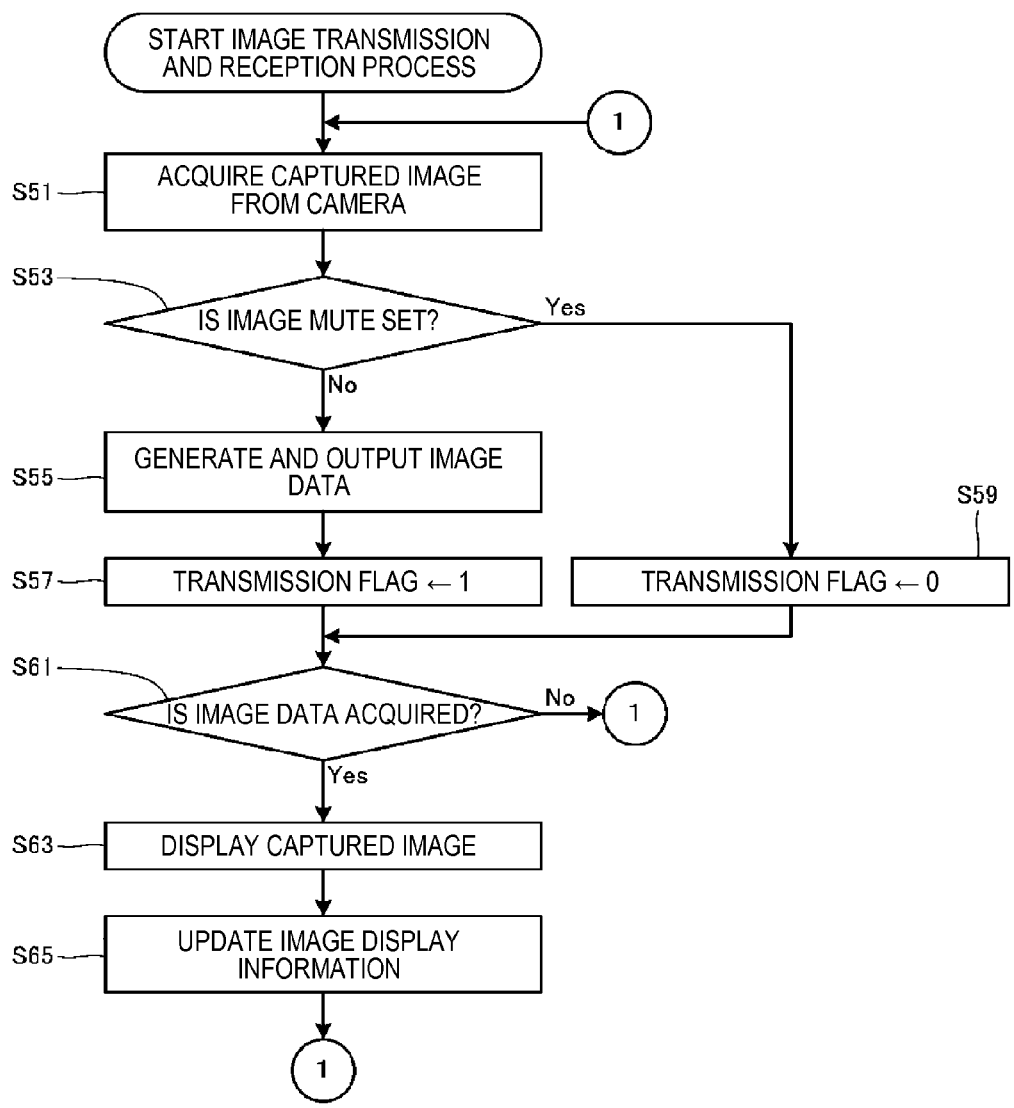
FIG. 6 is a flowchart of an image transmission and reception process.

The image transmission and reception process which is started in S15 of the main process illustrated in FIG. 4 will be described with reference to FIG. 6. The CPU 32 causing the image transmission and reception process to be started acquires an image captured by the camera 46 (S51). When the display of the captured image 380 is set on the teleconference screen (see FIG. 2), the CPU 32 generates a captured image 380 according to the acquisition in S51, and controls the display thereof. For example, the CPU 32 outputs an output instruction of the captured image 380 to the display unit 38. In the display unit 38, the captured image 380 is displayed in predetermined position in response to the output instruction. When the display of the captured image 380 is not set on the teleconference screen (see FIG. 3), the control of the display as described above is not performed.

Next, the CPU 32 determines whether image mute based on the image mute instruction is set (S53). The image mute instruction is an instruction of stopping the transmission of the image data corresponding to the image captured by the camera 46. The image mute instruction is input by the user of the communication terminal device 30 operating the operation unit 40. The user of the communication terminal device 30 can perform an input operation at the time of the start of the teleconference and during the transmission of image data. The CPU 32 acquires an image mute instruction according to the user operation. When the image mute instruction is acquired during the transmission of the image data, the CPU 32 stops the transmission of image data thereafter. When the image data is not transmitted from the communication terminal device 30, new image data is not transmitted to the counter party devices 71, 72, 73, and 74, and the captured image 380 being displayed is in a state of being temporarily stopped.

When the image mute is not set (S53: No), the CPU 32 encodes the acquired captured image according to a predetermined format (for example, a known compression format such as H.264), and generates image data corresponding to the captured image (S55). Then, in S55, the CPU 32 controls the transmission of the generated image data. The CPU 32 transmits the transmission instruction of the image data to the communication unit 56. Accordingly, the generated image data is transmitted respectively to the counter party devices 71, 72, 73, and 74 from the communication unit 56 through the server device 20. The image data includes the identification information of the communication terminal device 30. The server device 20 outputs the image data from the communication terminal device 30 to the counter party devices 71, 72, 73, and 74 having the identification information different from the identification information included in the image data. Thereafter, the CPU 32 stores a transmission flag set to "1" in the RAM 36 (S57), and moves the process to S61.

When the image mute is set (S53: Yes), the CPU 32 stores the transmission flag set to "0" in the RAM 36 (S59). Thereafter, the CPU 32 moves the process to S61. When the transmission of the image data is restarted, the user of the communication terminal device 30 operates the operation unit 40 to input an image mute release instruction. The CPU 32 acquires the image mute release instruction according to the user operation, restarts the transmission of the image data, and performs S55 and S57.

In S61, the CPU 32 determines whether image data is acquired from any of the counter party devices 71, 72, 73, and 74. Each piece of the image data from the counter party devices 71, 72, 73, and 74 is transmitted from the counter party devices 71, 72, 73, and 74 through the server device 20, and received by the communication unit 56. The CPU 32 acquires image data from any of the counter party devices 71, 72, 73, and 74 through the communication unit 56.

When the image data is acquired (S61: Yes), the CPU 32 plays the acquired image data, and controls the display of the played captured image (S63). For example, the CPU 32 decodes the acquired image data according to the predetermined format, and outputs the output instruction of the captured image which is obtained through decoding to the display unit 38. In the display unit 38, in response to the output instruction, the captured image is displayed at predetermined position. For example, when the image data is data from the counter party device 71, the captured image 381 is displayed at a predetermined position (see FIGS. 2 and 3).

Subsequently, the CPU 32 updates the image display information according to the display in S63 (S65). For example, it is assumed that respective settings of whether or not to display an image or settings of the display size for some or all of the captured images 381, 382, 383, and 384 have been changed at a predetermined timing. In this case, the CPU 32 updates the image display information according to the display in S63 according to a new setting. The image display information is stored in the RAM 36. When the image data is not received and the image data is not acquired by the communication unit 56 (S61: No) or after S65 is performed, the CPU 32 returns the process to S51, and performs the process of S51 and the subsequent processes. The image transmission and reception process is continuously performed until the conference connection with the server device 20 is disconnected.

<Notification Process>

The notification process performed in S21 of the main process illustrated in FIG. 4 will be described with reference to FIGS. 7 to 9. The CPU 32 that has started the notification process acquires conference state information (S71). The conference state information is information indicating the state of teleconference that is identified by the conference ID. An example of information included in the conference state information includes the following information. An example of first information includes the number of communication devices which are connected to the server device 20 for a conference, among the counter party devices 71, 72, 73, and 74. An example of second information includes the number of communication devices to which the organizer authority is set, and information indicating whether connection is made for a conference, among the communication terminal device 30 and the counter party devices 71, 72, 73, and 74. The first information and the second information are managed by the server device 20. Further, an example of third information includes a conference reservation time which is notified from the server device 20 at the time of conference connection. Although the description is omitted above, the CPU 32 acquires the conference reservation time received by the communication unit 56 through the communication unit 56 at the time of execution of the process of conference connection (see S11 in FIG. 4) and stores the conference reservation time in the RAM 36. In the embodiment, a description will be made assuming that the conference state information is the three pieces of information described above.

At the time of acquisition of the conference state information in S71, the CPU 32 outputs a transmission instruction of a state information request for requesting conference state information to the communication unit 56. Accordingly, the state information request is transmitted to the server device 20 from the communication unit 56. The server device 20 which has received and acquired the state information request transmits the number of all communication devices connected for a conference in the teleconference identified by the conference ID at that time, and information indicating whether there is a connection for a conference with the communication device to which the organizer authority is set, to the communication terminal device 30 which is the request source. The conference state information from the server device 20 is received in the communication unit 56, and the CPU 32 acquires conference state information from the server device 20 through the communication unit 56. Further, the CPU 32 acquires the conference reservation time which is the conference state information stored in the RAM 36.

Next, the CPU 32 determines whether the conference is presently going on according to the acquired conference state information (S73). For example, when the current time is earlier than the conference reservation time, the communication device having the organizer authority is connected for the conference, and the number of communication devices which are connected for the conference is plural, and the CPU 32 determines that the conference is going on (S73: Yes). In this case, the CPU 32 moves the process to S75. When any one of respective conditions described above is not satisfied, the CPU 32 determines that the conference is not going on (S73: No). In this case, the CPU 32 ends the notification process, and returns the process to S23 in FIG. 4.

In S75, the CPU 32 detects a capturing state of the camera 46. Subsequently, the CPU 32 determines whether capturing is being performed according to the detected capturing state (S77). With respect to S75 and S77, the CPU 32 detects whether the image data to be transmitted is generated in S55 of the image transmission and the reception process (see FIG. 6) which is started in S15 in FIG. 4, and when the image data is not generated, it is determined that capturing is not being performed (S77: No). In this case, the CPU 32 moves the process to S103 in FIG. 9. When the image data is sequentially generated, the CPU 32 determines that capturing is being performed (S77: Yes), and performs the image analysis process on the image data that has been sequentially generated (S79). The image analysis process will be described later.

After performing the image analysis process, the CPU 32 determines whether an analysis result represents "abnormal image" (S81). When the analysis result represents "normal image", and does not represent "abnormal image" (S81: No), the CPU 32 ends the notification process, and returns the process to S23 in FIG. 4. When the analysis result represents an abnormal image (S81: Yes), the CPU 32 acquires a transmission flag (S83). The transmission flag is set in S57 or S59 in FIG. 6, and stored in RAM 36. Subsequently, it is determined if the acquired transmission flag is "1" (S85). When the transmission flag is not "1" but is "0" (S85: No), the CPU 32 moves the process to S103 in FIG. 9. When the transmission flag is "1" (S85: Yes), the CPU 32 moves the process to S87 in FIG. 8.

Figure 8:
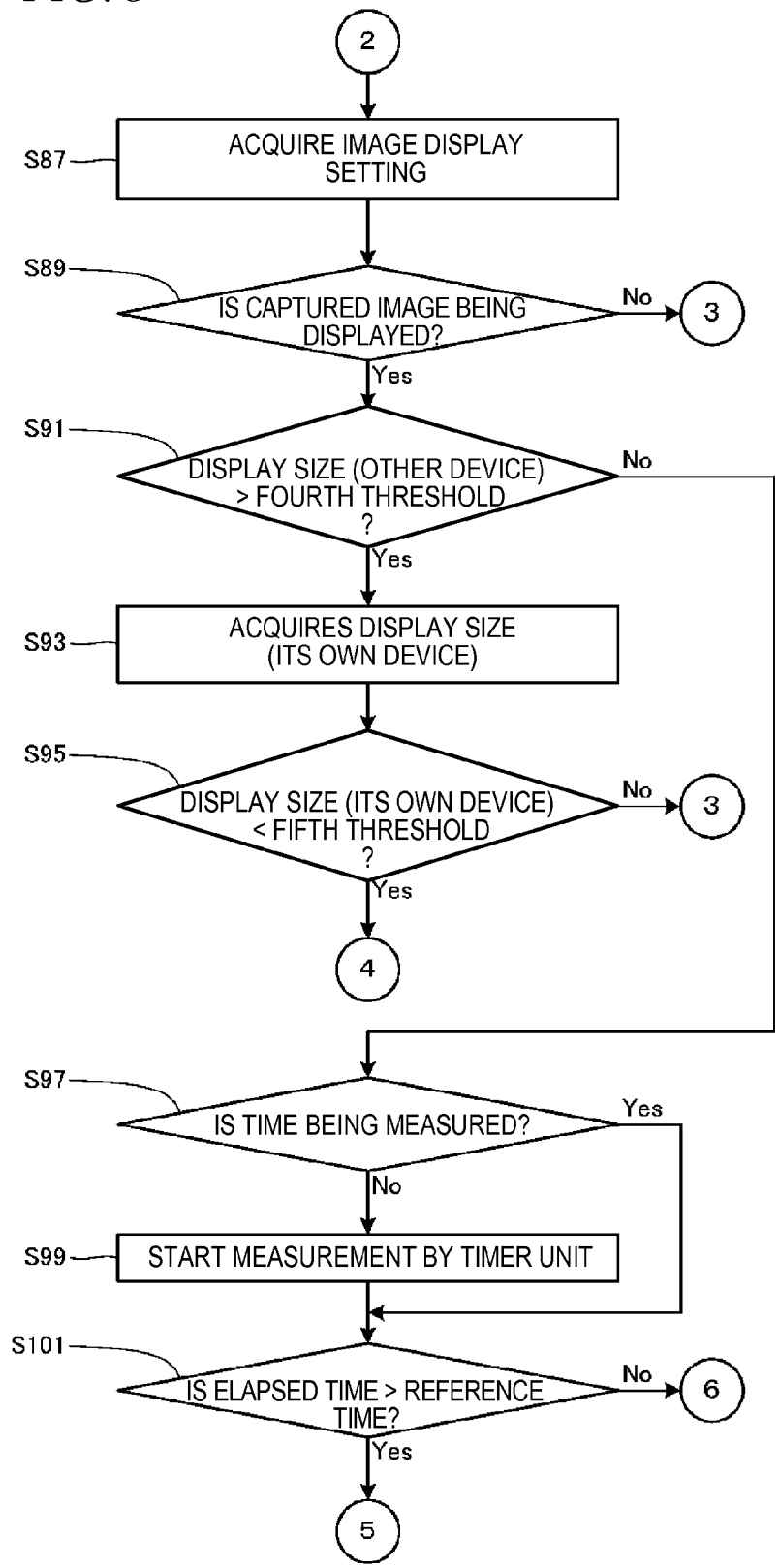
FIG. 8 is a flowchart illustrating a second part of the notification process.

In S87 in FIG. 8, the CPU 32 acquires an image display setting. The image display setting acquired by the CPU 32 in S87 is setting information regarding the display of the captured image 380 in each of the counter party devices 71, 72, 73, and 74 other than its own device. The image display setting includes information indicating whether or not the captured image 380 corresponding to the image data transmitted in S55 in FIG. 6 is displayed in each of the counter party devices 71, 72, 73, and 74. Further, when the captured image 380 is being displayed, the image display setting includes information indicating the display size of the captured image 380 being displayed. In the image display setting, the information indicating display or non-display or the information indicating the display size of the captured image 380 being displayed is associated with identification information of each of the counter party devices 71, 72, 73, and 74. Similarly to the case of the image display information described with reference to S19 in FIG. 4, the information indicating display or non-display may be used with the display size of the captured image 380 associated with the identification information of each of the counter party devices 71, 72, 73, and 74.

In S87, the CPU 32 outputs a transmission instruction of a display setting request, for requesting an image display setting, to the communication unit 56. Accordingly, the display setting request is transmitted to the server device 20 from the communication unit 56. The display setting request includes the identification information of the communication terminal device 30. The server device 20 that has received the display setting request specifies display or non-display of the captured image 380 in the counter party devices 71, 72, 73, and 74 of the identification information that is different from the identification information included in the display setting request. Then, the server device 20 specifies the display size of the captured image 380 being displayed.

As described above, in the counter party devices 71, 72, 73, and 74, information indicating display or non-display with respect to the display of the captured image including the captured image 380 corresponding to the image data from the communication device other than the devices themselves, among the communication terminal device 30 and the counter party devices 71, 72, 73, and 74, and image display information including the display size of the captured image being displayed are transmitted to the server device 20. The server device 20 receives and acquires the image display information which is transmitted from the communication terminal device 30 in S19 in FIG. 4, and the image display information from each of the counter party devices 71, 72, 73, and 74. In the server device 20, each piece of information included in the image display information is stored in association with the identification information of each communication device of the transmission source device included in each piece of the acquired image display information. The choice of whether or not to display the captured image 380 in the counter party devices 71, 72, 73, and 74, and the display size of the captured image 380 being displayed, which are described above, are specified according to each piece of information stored in this manner.

The server device 20 transmits the image display setting including each piece of specified information to the communication terminal device 30 which is the request source. The image display setting from the server device 20 is received in the communication unit 56, and the CPU 32 acquires the image display setting through the communication unit 56. The CPU 32 stores the acquired image display setting in the RAM 36. Subsequently, the CPU 32 determines whether or not the captured image 380 is being displayed in any communication device of the counter party devices 71, 72, 73, and 74, according to the acquired image display setting (S89). When the captured image 380 is not displayed in all of the counter party devices 71, 72, 73, and 74 (S89: No), the CPU 32 ends the notification process, and returns the process to S23 in FIG. 4.

When the captured image 380 is being displayed in any of the counter party devices 71, 72, 73, and 74 (S89: Yes), the CPU 32 determines whether the display size of the displayed captured image 380 is greater than a fourth threshold (S91).

For example, the fourth threshold is determined considering whether the user of the communication terminal device 30 included in the captured image 380 can be clearly recognized, when the users of the counter party devices 71, 72, 73, and 74 recognize the captured image 380. The fourth threshold is stored in association with the program of the notification process in the storage unit 34. In addition, the fourth threshold may be appropriately set by, for example, the user having the organizer authority. When the captured image 380 is displayed in a plurality of communication devices among the counter party devices 71, 72, 73, and 74, the CPU 32 uses the maximum display size for comparison to the fourth threshold. In addition, the CPU 32 may obtain an average value of the display size of the captured image 380 so as to use the average value for comparison to the fourth threshold. The display size in the communication device to which the highest authority is set, among the counter party devices 71, 72, 73, and 74, may be used for comparison with the fourth threshold. The display size for comparison is appropriately determined considering various conditions.

When the display size of the captured image 380 is the fourth threshold or less (S91: No), the CPU 32 moves the process to S97. When the display size of the captured image 380 is greater than the fourth threshold (S91: Yes), the CPU 32 acquires the display size of the captured image 380 of its own device (S93). Subsequently, the CPU 32 determines whether the display size of the captured image 380 of its own device is smaller than a fifth threshold (S95). For example, the fifth threshold is determined considering whether the user can clearly recognize himself/herself as included in the captured image 380, when the user of the communication terminal device 30 views the captured image 380 being displayed. The fifth threshold is stored in association with the program of the notification process in the storage unit 34. The fifth threshold may be different from or the same as the fourth threshold in S91. When the display size of the captured image 380 is equal to or higher than the fifth threshold (S95: No), the CPU 32 ends the notification process, and returns the process to S23 shown in FIG. 4. When the display size of the captured image 380 is smaller than the fifth threshold (S95: Yes), the CPU 32 moves the process to S103 shown in FIG. 9. When the captured image 380 is not displayed (see FIG. 3), in S93, the CPU 32 acquires "horizontal×vertical: 0×0 pixel" (area: 0) as the display size of the captured image 380, and determines that the display size is smaller than the fifth threshold in S95 (see S95: Yes).

In S97, the CPU 32 determines whether the elapse of time is being measured by the timer unit 54. When the elapse of time is not being measured (S97: No), the CPU 32 starts the measurement (S99). When S99 is already executed and the elapse of time is being measured (S97: Yes), or after execution of S99, the CPU 32 determines whether the elapsed time being measured by the timer unit 54 is over a reference time (S101). The reference time is stored in association with the program of the notification process in the storage unit 34. When the elapsed time is over the reference time (S101: Yes), the CPU 32 moves the process to S111 in FIG. 9. When the elapsed time is the reference time or less (S101: No), the CPU 32 moves the process to S107 in FIG. 9.

Figure 9:
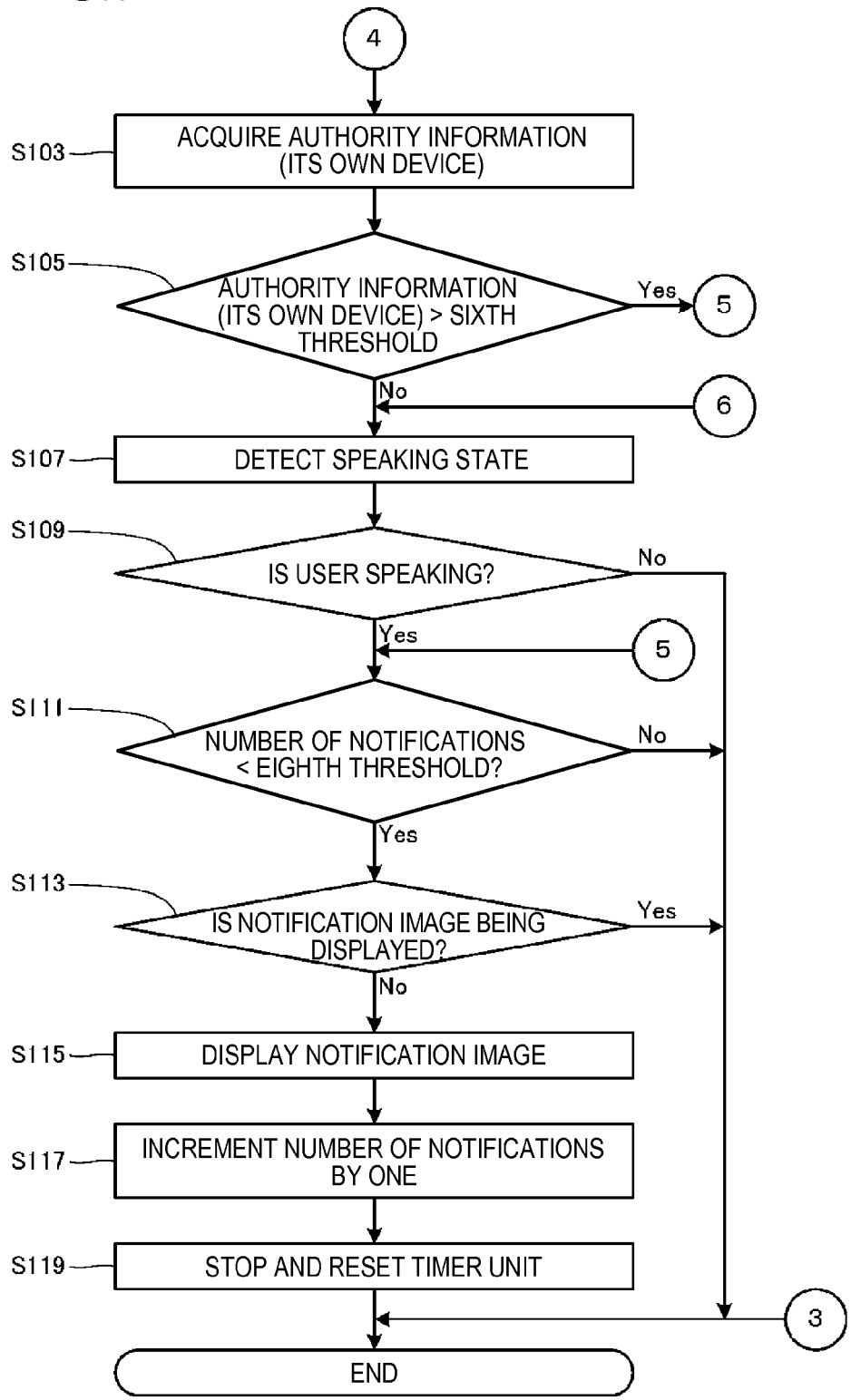
FIG. 9 is a flowchart illustrating a third part of the notification process.

In S103 in FIG. 9, the CPU 32 acquires the authority information which is set to the communication terminal device 30. In S103, the CPU 32 accesses the RAM 36 so as to acquire the authority information stored in the RAM 36 in S17 in FIG. 4. For example, when the authority information which is set in the communication terminal device 30 is the presenter authority, the CPU 32 acquires the authority information "presenter authority". Subsequently, the CPU 32 determines whether the authority of the acquired authority information is higher than the sixth threshold (S105). The sixth threshold is set, for example, to the viewer authority. However, the authority which is set to the sixth threshold may be the presenter authority. The authority which is set to the sixth threshold is appropriately set considering various conditions. The sixth threshold is stored in association with the program of the notification process in the storage unit 34. When the acquired authority information is higher than the sixth threshold (S105: Yes), the CPU 32 moves the process to S111. When the acquired authority information is the sixth threshold or less (S105: No), the CPU 32 moves the process to S107.

In S107, the CPU 32 detects a speaking state of the user of the communication terminal device 30. Subsequently, the CPU 32 determines whether the user of the communication terminal device 30 is speaking, according to the detected speaking state (S109). The CPU 32 determines whether the user is speaking in S109, by detecting the speaking state in S107, according to the speaking state stored in the RAM 36 in S37, based on the determination result in S33 of the sound transmission and reception process (see FIG. 5) which is started in S13 in FIG. 4. In other words, when S33 is positive (S33 in FIG. 5: Yes) and "speaking" is stored in the RAM 36, the CPU 32 sets S109 to being positive (S109: Yes). When S33 is negative (S33 in FIG. 5: No) and "watching" is stored in the RAM 36, the CPU 32 sets S109 as being negative (S109: No). When S109 is positive (S109: Yes), the CPU 32 moves the process to S111.

In S111, the CPU 32 determines whether the number of notifications is smaller than the eighth threshold. The number of notifications is the number of times of the notification image 385 being displayed in S115 which will be described later. Accordingly, the number of notifications matches the number of executions of S115. The eighth threshold is appropriately set considering how many times the display of the notification image 385 is repeated. The eighth threshold is stored in association with the program of the notification process in the storage unit 34. When the number of notifications is smaller than the eighth threshold (S111: Yes), the CPU 32 determines whether the notification image 385 displayed in S115 which is previously executed is still being displayed (S113). The notification image 385 is not displayed at a timing in which a certain time has elapsed after the display. In addition, it is assumed that the notification image 385 is not displayed at a timing in which the CPU 32 acquires a past instruction which is input through the operation unit 40 such as tapping of the displayed notification image 385 by the user of the communication terminal device 30.

Figure 10:
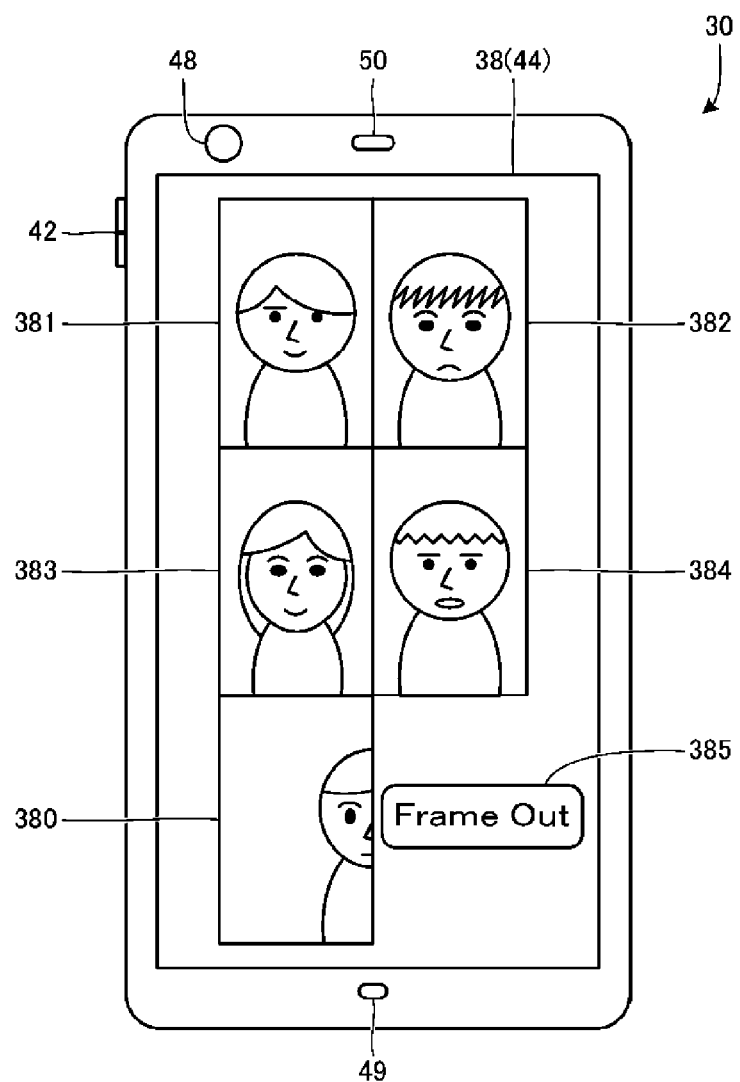
FIG. 10 is a diagram illustrating an example of a state in which a notification image is displayed on the teleconference screen in which the image captured by the communication terminal device is displayed.

When the notification image 385 is not being displayed (S113: No), the CPU 32 controls the display of the notification image 385 (S115). The CPU 32 reads the image data corresponding to the notification image 385 from the storage unit 34, and the processes the image data so as to obtain the notification image 385. Subsequently, the CPU 32 outputs the output instruction of the notification image 385 to the display unit 38. In the display unit 38, the notification image 385 is displayed in response to the output instruction (see FIG. 10). As illustrated in FIG. 10, when the captured image 380 is displayed, the display position of the notification image 385, for example, is the position adjacent to the captured image 380. The display position of the notification image 385 may be a position in which the notification image 385 overlaps the captured image 380 being displayed or the notification image 385 does not overlap all captured images being displayed. When the captured image 380 is not displayed, the display position of the notification image 385 may be a predetermined position (for example, a center) of the teleconference screen, or a position in which the notification image 385 does not overlap all captured images being displayed. The display position of the notification image 385 is appropriately set considering various conditions. The notification image 385 may have an aspect different from that of FIG. 10. For example, the notification image 385 may be an icon having a predetermined shape. The notification image 385 may blink.

After the execution of S115, the CPU 32 increments the number of notifications of the notification image 385 which is counted by the counter by one (S117). In addition, the number of notifications counted by the counter is reset, for example, after the main process (FIG. 4) is started and before S17 is executed. Subsequently, the CPU 32 stops the measurement by the timer unit 54, and resets the measured time (S119).

When S109 or S111 is negative (S109 or S111: No), and S113 is positive (S113: Yes), or after the execution of S119, the CPU 32 ends the notification process, and returns the process to S23 in FIG. 4.

<Image Analysis Process>

The image analysis process performed in S79 (see FIG. 7) of the notification process illustrated in FIGS. 7 to 9 will be described with reference to FIG. 11. The CPU 32 which has started the image analysis process acquires acceleration information representing an acceleration which is measured by the acceleration measurement unit 52 (S121). The acceleration information may be the value of the acquired acceleration. The value of the acquired acceleration may be a voltage value which is output from the acceleration measurement unit 52, or may be a value obtained by converting the voltage value into the acceleration. The CPU 32 stores the sequentially acquired acceleration value in the RAM 36. The CPU 32 specifies the amount of change per unit time of the acquired acceleration. The amount of change is specified by, for example, a difference between the acceleration value stored in the RAM 36 and a newly acquired acceleration value. Subsequently, the CPU 32 determines whether the specified amount of change of the acceleration is larger than the third threshold (S123). When the communication terminal device 30 is set in a state of being fixed to a predetermined place, the amount of change of the acceleration per unit time which is measured by the acceleration measurement unit 52 is "0". The third threshold is appropriately set by qualifying the upper limit of the amount of change of the acceleration when it is determined that the communication terminal device 30, specifically, the camera 46 is shaken, and a certain range is not taken continuously. The third threshold is stored in association with the program of the image analysis process in the storage unit 34. Respective values which are measured by a gyro sensor included in the communication terminal device 30 are acquired, and it may be determined whether a certain range is not taken continuously, by using a measurement value by the gyro sensor. In this case, it is determined whether the process is moved to either of S125 or S135 based on, for example, S123 described above and the determination using the measurement value by the gyro sensor.

When the amount of change of the acceleration is larger than the third threshold (S123: Yes), the CPU 32 moves the process to S135. When the amount of change of the acceleration is the third threshold or less (S123: No), the CPU 32 acquire the brightness of the captured image 380 corresponding to the image data generated in S55 in FIG. 6 (S125). The brightness of the captured image 380 is obtained, for example, by specifying the brightness of all pixels forming the captured image 380 and calculating the average value thereof. In addition, the average value may be calculated not by using all pixels forming the captured image 380, but by using only pixels included in a specific region. Further, instead of or in addition to the average value, a most frequent value or a center value may be used. Subsequently, the CPU 32 determines whether the acquired brightness is higher than a first threshold (S127). For example, in order to prevent the capturing by the camera 46, the camera 46 is covered with a predetermined coated material in some cases. In such a case, it is estimated that the brightness of the captured image 380 is reduced. The first threshold is appropriately set by considering the range of the brightness when the user of the communication terminal device 30 is taken by the camera 46 and the lower limit of the brightness when it is determined that the quality of the captured image 380 is appropriate. The first threshold is stored in association with the program of the image analysis process in the storage unit 34.

When the brightness is the first threshold or less (S127: No), the CPU 32 moves the process to S135. When the brightness is higher than the first threshold (S127: Yes), the CPU 32 determines whether the brightness is lower than the second threshold (S129). For example, in order to prevent the capturing by the camera 46, the camera 46 is put in a direction different from the direction of the user of the communication terminal device 30 in some cases. For example, if camera 46 is directed to a direction of a light source in the ceiling, there is a possibility of the brightness of the captured image 380 being increased. The second threshold is appropriately set by considering the range of the brightness when the user of the communication terminal device 30 is taken by the camera 46 and the upper limit of the brightness when it is determined that the quality of the captured image 380 is appropriate. The second threshold is set to a value higher than the first threshold. The second threshold is stored in association with the program of the image analysis process in the storage unit 34.

When the brightness is equal to or higher than the second threshold (S129: No), the CPU 32 moves the process to S135. When the brightness is lower than the second threshold (S129: Yes), the CPU 32 determines whether a person is detected from the captured image 380 (S131). The detection of a person is performed by using, for example, a known face detection technology. For example, a Viola-Jones method, which performs a pattern matching of a cascade structure using the Haar-Like feature amount for a search window of a predetermined size, is available as the face-detection technology. In addition, if the entire face of the user of the communication terminal device 30 is not included as the captured image 380 illustrated in FIG. 10, the person is not regarded as detected. When the person is detected (S131: Yes), the CPU 32 stores the analysis result representing "normal image" in the RAM 36 (S133). The analysis result representing the "normal image" is information indicating that a person is included in the captured image 380, and the person is detected in the captured image 380. When a person is not detected (S131: No), the CPU 32 moves the process to S135.

In S135, the CPU 32 stores the analysis result representing "abnormal image" in the RAM 36. The analysis result representing the "abnormal image" is information indicating that a person is not included in the captured image 380 and that a person is not detected. After S133 or S135 is executed, the CPU 32 ends the image analysis process, and returns the process to S81 in FIG. 7.

Effect of Embodiments

According to the embodiments described above, it is possible to achieve the following effect.

Figure 7:
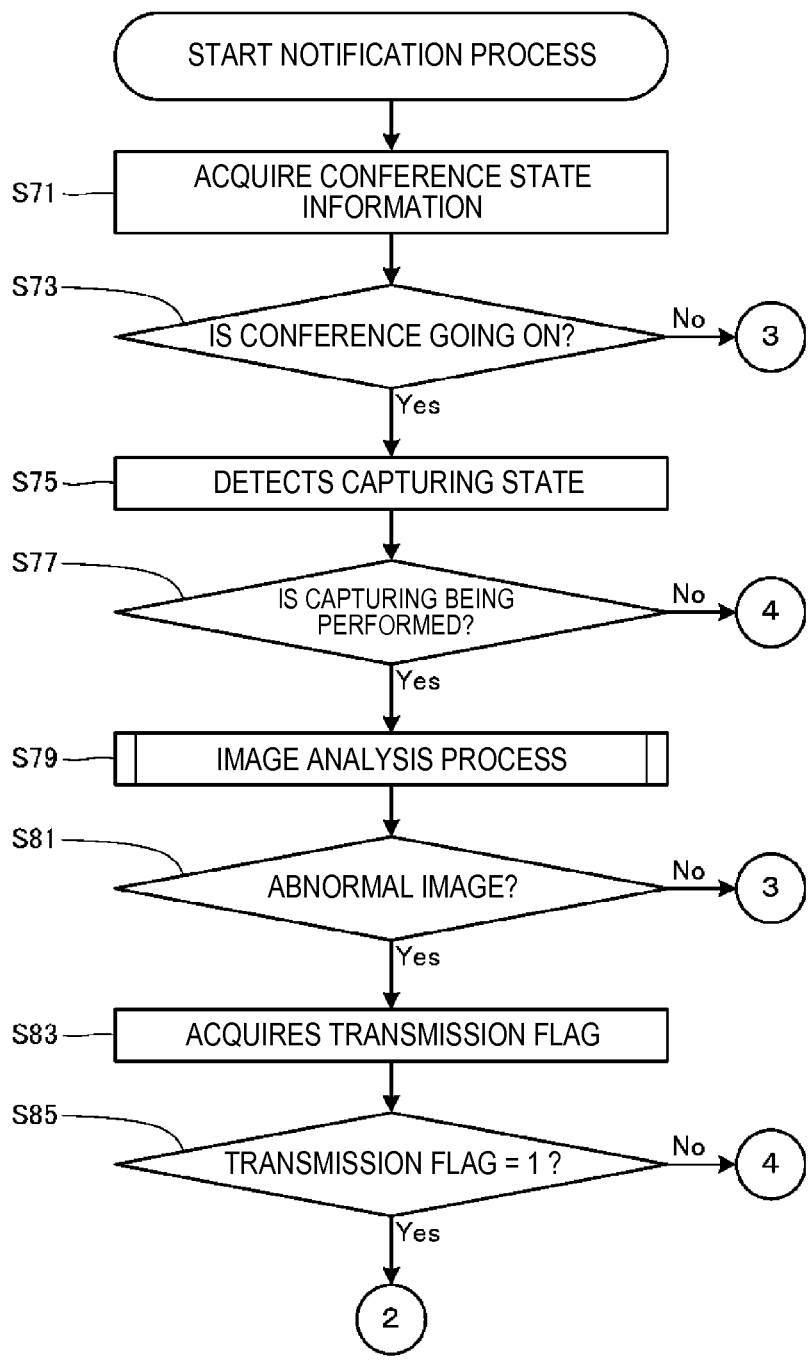
FIG. 7 is a flowchart illustrating a first part of a notification process.

(1) In the communication terminal device 30, when it is determined that the image is abnormal in S81 (see FIG. 7) of the notification process illustrated in FIGS. 7 to 9 (see S81: Yes), and the captured image 380 is being displayed on any of the counter party devices 71, 72, 73, and 74 in S89 (see FIG. 8) (see S89: Yes), it is possible to perform a process of displaying the notification image 385 (see S115 in FIG. 9). Meanwhile, when it is determined that the image is normal in S81 (see S81: No), or the captured image 380 is not displayed on all of the counter party devices 71, 72, 73, and 74 in S89 (see S89: No), S115 is not performed, and as a result, it is not possible to display the notification image 385.

Therefore, when the captured images 380 displayed on some or all of the counter party devices 71, 72, 73, and 74 are in an abnormal state, it is possible to notify the user of the communication terminal device 30 of that fact. The user of the communication terminal device 30 who views the notification image 385 can take action to avoid the abnormal state. Meanwhile, when the captured images 380 displayed on some or all of the counter party devices 71, 72, 73, and 74 are in a normal state, or when the captured images 380 is not displayed on all of the counter party devices 71, 72, 73, and 74, the notification image 385 is not displayed. Therefore, it is possible to prevent the user of the communication terminal device 30 from focusing on the notification image 385 and not the agenda of the teleconference. The user of the communication terminal device 30 is therefore able to concentrate on the discussion at the teleconference.

Figure 11:
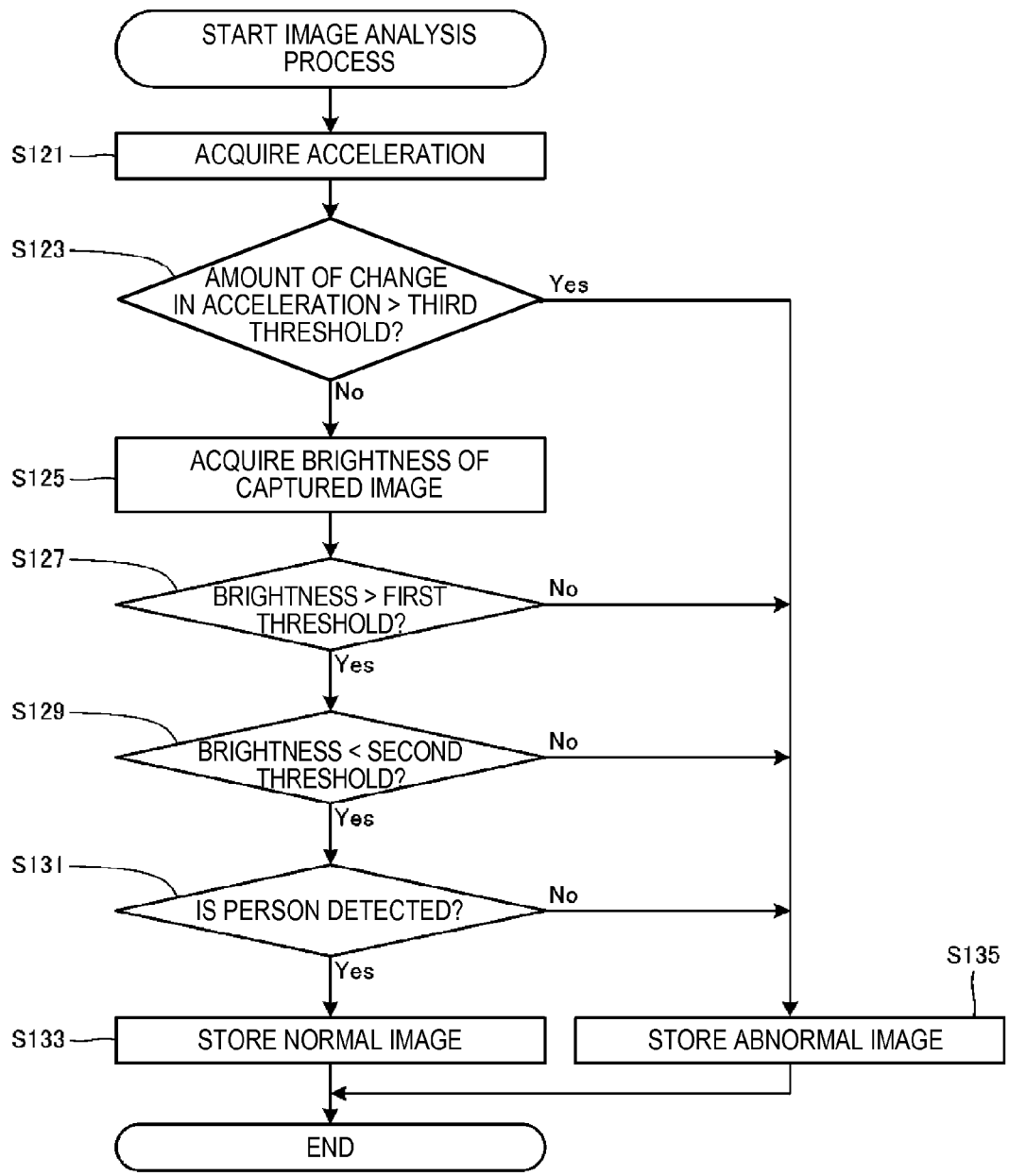
FIG. 11 is a flowchart of an image analysis process.

(2) It is assumed that the normality or abnormality of the captured image 380 is determined based on the amount of change in the acceleration per unit time which is measured by the acceleration measurement unit 52, the brightness of the captured image 380, and the result of person detection (see S123, S127 to S131 in FIG. 11). Therefore, it is possible to properly determine the normality or abnormality of the captured image 380.

(3) In the notification process, even if S81 and S89 are positive (see S81 and S89: Yes), it is possible to switch the execution or non-execution of S115 according to determination results based on both conditions of S91, S95 and S101 (see FIG. 8), and S105, S109 and S111 (see FIG. 9). Therefore, it is possible to properly perform the display or non-display of the notification image 385.

S91 is based on the assumption that the largeness of the display sizes of the captured images 380 displayed on some or all of the counter party devices 71, 72, 73, and 74 and the interest in the captured image 380 of the user of each of the counter party devices 71, 72, 73, and 74 are proportional to each other. S95 is based on the assumption that when the display size of the captured image 380 being displayed is large (see S95: No), even if the notification image 385 is not displayed, the user of the communication terminal device 30 himself/herself can recognize the state of the captured image 380. S101 is based on the assumption that the display time of the captured image 380 displayed on some or all of the counter party devices 71, 72, 73, and 74 and the interest in the captured image 380 of the user of each of the counter party devices 71, 72, 73, and 74 are proportional.

S105 is based on the assumption that the user of each of the counter party devices 71, 72, 73, and 74 concentrates on the captured image 380 in the communication terminal device 30 to which a higher authority has been set, regardless of the presence or absence of the speaking of the user of the communication terminal device 30. S109 is based on the assumption that the user of each of the counter party devices 71, 72, 73, and 74 concentrates on the user of the communication terminal device 30 who is a speaker, and watches the captured image 380. S111 is based on the assumption that the user of the communication terminal device 30 intentionally ignores the notification image 385.

Modification Example

The embodiment described above may be modified in the following manner. It is possible to appropriately combine some configurations in the following modification examples for use. Even in cases of employing the following configuration, it is possible to achieve the same effect as that described above.

Figure 5:
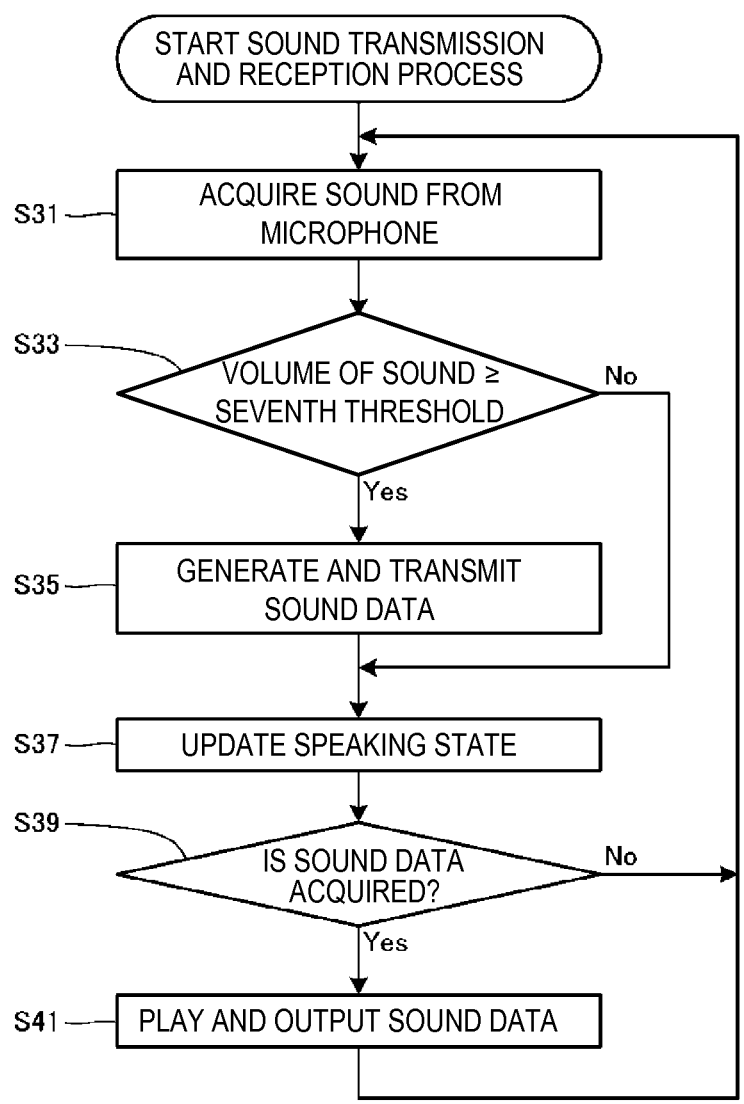
FIG. 5 is a flowchart of a sound transmission and reception process.

(1) In the above description, in S33 of the sound transmission and reception process illustrated in FIG. 5, when the volume level of the acquired sound is the same as the seventh threshold, the determination is assumed to be positive (S87: Yes). In S33, determination may be made based on whether the volume level of sound is greater than the seventh threshold, and when the volume level of sound is the same as the seventh threshold, the determination may be assumed to be negative (S33: No).

(2) In the above description, in S91 (see FIG. 8) of the notification process illustrated in FIGS. 7 to 9, when the display size of the captured image 380 displayed in each of the counter party devices 71, 72, 73, and 74 is the same as the fourth threshold, the determination may be assumed to be negative (S91: No). In S91, determination may be made based on whether the display size of the captured image 380 is the fourth threshold or more, and when the display size of the captured image 380 is the same as the fourth threshold, the determination may be assumed to be positive (S91: Yes).

In S95 in FIG. 8, when the display size of the captured image 380 displayed in the communication terminal device 30 is the same as the fifth threshold, the determination is assumed to be negative (S95: No). In S95, determination may be made based on whether the display size of the captured image 380 is the fifth threshold or less, and when the display size of the captured image 380 is the same as the fifth threshold, the determination may be assumed to be positive (S95: Yes).

In S101 in FIG. 8, when the elapsed time is the same as the reference time, the determination is assumed to be negative (S101: No). In S101, determination may be made based on whether the elapsed time is the reference time or more, and when the elapsed time is the same as the reference time, the determination may be assumed to be positive (S101: Yes).

In S105 in FIG. 9, when the authority information of the communication terminal device 30 is the same as a sixth threshold, the determination is assumed to be negative (S105: No). In S105, determination may be made based on whether the authority information of the communication terminal device 30 is the sixth threshold or more, and when the authority information of the communication terminal device 30 is the same as the sixth threshold, the determination may be assumed to be positive (S105: Yes).

In S111 in FIG. 9, when the number of notifications counted by the counter is the same as an eighth threshold, the determination is assumed to be negative (S111: No). In S111, determination may be made based on whether the number of notifications of the communication terminal device 30 is the eighth threshold or less, and when the number of notifications of the communication terminal device 30 is the same as the eighth threshold, the determination may be assumed to be positive (S111: Yes).

(3) In the above description, in S115 (see FIG. 9) of the notification process, the notification image 385 is assumed to be displayed. Under various types of determination, the notification to the user of the communication terminal device 30 when the process reaches S115 may be performed in a method different from the display of the notification image 385. For example, as notification information that is similar to that of the notification image 385, a notification sound may be caused to be emitted from the speaker 50 of the audio unit 48. In this case, the CPU 32 outputs an output instruction of the notification sound to the audio unit 48 in S115. In S113, determination is made based on whether the notification sound is being emitted. In addition, the communication terminal device 30 may include an e-mail function, and a light emitter that flashes or is lit when an e-mail is received. In S115, the output of the notification information may be performed through a blinking or lighting of the light emitter described above which functions as a notification unit. In this case, in S115, the CPU 32 outputs a flashing instruction or a lighting instruction to the light emitter. In S113, determination is made based on whether the light emitter is flashing or being lit.

(4) In the above description, in S123 of the image analysis process illustrated in FIG. 11, when the amount of change in the acceleration is the same as the third threshold, the determination is assumed to be negative (S123: No). In S123, determination is made based on whether the amount of change in the acceleration is the third threshold or more, and when the amount of change in the acceleration is the same as the third threshold, the determination may be assumed to be positive (S123: Yes).

In S127 in FIG. 11, when the brightness of the captured image 380 acquired in S125 is the same as the first threshold, the determination is assumed to be negative (S127: No). In S127, determination is made based on whether the brightness is the first threshold or more, and when the brightness is the same as the first threshold, the determination may be assumed to be positive (S127: Yes).

In S129 in FIG. 11, when the brightness of the captured image 380 acquired in S125 is the same as the second threshold, the determination is assumed to be negative (S129: No). In S129, determination is made based on whether the brightness is the second threshold or less, and when the brightness is the same as the second threshold, the determination may be assumed to be positive (S129: Yes).

(5) In the above description, the first threshold (see S127 in FIG. 11), the second threshold (see S129 in FIG. 11), the third threshold (see S123 in FIG. 11), the fourth threshold (see S91 in FIG. 8), the fifth threshold (see S95 in FIG. 8), the sixth threshold (see S105 in FIG. 9), the seventh threshold (see S33 in FIG. 5) and the eighth threshold (see S111 in FIG. 9) are assumed to be fixed values. Some or all of the first threshold to the eighth threshold can be appropriately set, and thus may be appropriately changed. For example, the setting described above or another change may be performed at a predetermined timing such as the start of the teleconference.

What is claimed is:

1. A non-transitory computer readable recording medium storing a computer-executable program, when executed by a computer of a communication terminal device which is used for teleconferencing through a network and includes a camera, a communication unit and a notification unit, causing the communication terminal device to execute:
a transmission control instruction of transmitting image data from the communication unit of the communication terminal device to a counter party device, the image data corresponding to an image captured by the camera of the communication terminal device, the communication unit being connected to the network, the counter party device participating in the teleconference via a teleconferencing application being executed in the counter party device;
a first acquisition instruction of acquiring an image display setting indicating whether the captured image corresponding to the image data transmitted to the counter party device is displayed by the teleconferencing application executed in the counter party device according to transmission of the image data by the transmission control instruction, the image display setting being transmitted from the counter party device by the teleconferencing application executed in the counter party device;
a first determination instruction of determining whether a state of the captured image is in a first state or a second state;
a second determination instruction of determining whether the captured image is displayed by the teleconferencing application executed in the counter party device based on the image display setting; and
an output control instruction of:
outputting notification information from the notification unit of the communication terminal device in a first case in which the determination instruction determines that the captured image is in the first state and the second determination instruction determines that the captured image is displayed by the teleconferencing application executed in the counter party device; and
not outputting the notification information from the notification unit in a second case in which the first determination instruction determines that the captured image is in the second state and the second determination instruction determines that the captured image is not displayed by the teleconferencing application executed in the counter party device.

2. The non-transitory computer readable recording medium according to claim 1,
wherein the program causes the communication terminal device to execute a second acquisition instruction of acquiring brightness of the captured image, and
wherein the first determination instruction includes an instruction of determining the state of the captured image based on the brightness of the captured image.

3. The non-transitory computer readable recording medium according to claim 2,
wherein the first determination instruction includes:
an instruction of determining that the captured image is in the first state when a brightness of the captured image is equal to or lower than a first threshold;
an instruction of determining that the captured image is in the first state when the brightness of the captured image is equal to or higher than a second threshold which is higher than the first threshold; and
an instruction of determining that the captured image is in the second state when the brightness of the captured image is higher than the first threshold and lower than the second threshold.

4. The non-transitory computer readable recording medium according to claim 1,
wherein the program causes the communication terminal device to execute an analysis instruction of analyzing whether a person is included in the captured image, and
wherein the first determination instruction includes:
an instruction of determining that the captured image is in the first state when the analysis instruction analyzes that a person is not included in the captured image, and an instruction of determining that the captured image is in the second state when the analysis instruction analyzes that a person is included in the captured image.

5. The non-transitory computer readable recording medium according to claim 4, wherein the analysis instruction includes an instruction of performing face detection to analyze whether a person is included in the captured image.

6. The non-transitory computer readable recording medium according to claim 1,
wherein the program causes the communication terminal device to execute a third acquisition instruction of acquiring acceleration information indicating an acceleration which is measured by an acceleration measurement unit included in the communication terminal device, and
wherein the first determination instruction includes:
an instruction of determining that the captured image is in the first state when an amount of change in the acceleration per unit time which is acquired by the third acquisition instruction is greater than a third threshold, and
an instruction of determining that the captured image is in the second state when the amount of change in the acceleration per unit time which is acquired by the third acquisition instruction is equal to or smaller than the third threshold.

7. The non-transitory computer readable recording medium according to claim 1,
wherein the program causes the communication terminal device to execute a fourth acquisition instruction of acquiring a first size indicating a display size of the captured image displayed in the counter party device when the first acquisition instruction acquires the image display setting indicating that the captured image is displayed, and
wherein the output control instruction includes:
an instruction of outputting the notification information from the notification unit when it is the first case and when the first size acquired by the fourth acquisition instruction is greater than a fourth threshold, and
an instruction of not outputting the notification information from the notification unit when it is in the first case and when the first size acquired by the fourth acquisition instruction is equal to or smaller than the fourth threshold.

8. The non-transitory computer readable recording medium according to claim 7,
wherein the program causes the communication terminal device to execute as a clock instruction of starting measurement of elapse of time in a timer unit included in the communication terminal device when it is the first case and when the first size acquired by the fourth acquisition instruction is smaller than the fourth threshold, and
wherein the output control instruction includes a function of outputting the notification information from the notification unit when a time measured by the timer unit is equal to or greater than a reference time.

9. The non-transitory computer readable recording medium according to claim 1,
wherein the output control instruction includes an instruction of displaying the captured image on a display unit of the communication terminal device, the display unit being included in the notification unit,
wherein the program causes the communication terminal device to execute a fourth acquisition instruction of acquiring a second size indicating a display size of the captured image being displayed on the display unit, and
wherein the output control instruction includes:
an instruction of outputting the notification information from the notification unit when it is the first case and when the captured image is not displayed on the display unit,
an instruction outputting the notification information from the notification unit when it is the first case and when the second size acquired by the fourth acquisition instruction is smaller than a fifth threshold, and
an instruction of not outputting the notification information from the notification unit when it is the first case and when the second size acquired by the fourth acquisition instruction is equal to or greater than the fifth threshold.

10. The non-transitory computer readable recording medium according to claim 1, wherein the output control instruction includes:
an instruction of outputting the notification information from the notification unit when it is the first case and when transmission of the image data by the transmission control instruction is not interrupted, and
an instruction of not outputting the notification information from the notification unit when the determination instruction determines that the captured image is in the first state, and transmission of the image data by the transmission control instruction is interrupted, regardless of the image display setting indicating that the captured image is displayed.

11. The non-transitory computer readable recording medium according to claim 1,
wherein the program causes the communication terminal device to execute a fifth acquisition instruction of acquiring authority information which is set for the communication terminal device with respect to authority indicating a degree of functions available in the teleconference, and
wherein the output control instruction includes:
an instruction of outputting the notification information from the notification unit when it is the first case and when the authority information acquired by the fifth acquisition instruction is higher than a sixth threshold; and
an instruction of not outputting the notification information from the notification unit when it is the first case and when the authority information acquired by the fifth acquisition instruction is equal to or lower than the sixth threshold.

12. The non-transitory computer readable recording medium according to claim 1,
wherein the program causes the communication terminal device to execute a detection instruction of detecting a volume level of data corresponding to sound collected in a microphone of the communication terminal device,
wherein the output control instruction includes:
an instruction of outputting the notification information from the notification unit when it is the first case and when the volume level detected by the detection instruction is equal to or higher than a seventh threshold, and
an instruction of not outputting the notification information from the notification unit when it is the first case and when the volume level detected by the detection instruction is lower than a seventh threshold.

13. The non-transitory computer readable recording medium according to claim 1,
wherein the program causes the communication terminal device to execute a counting instruction of counting a number of notifications of the notification information output from the notification unit, wherein the output control instruction includes:

an instruction of outputting the notification information from the notification unit when it is the first case and when the number of notifications counted by the count instruction is smaller than an eighth threshold, and an instruction of not outputting the notification information from the notification unit when it is the first case and when the number of notifications counted by the count instruction is equal to or greater than an eighth threshold.

14. A communication terminal device used for teleconference through a network, comprising:

a communication unit;

a notification unit;

a processor; and memory storing a computer readable recording medium storing a program, when executed by the processor, causing the communication terminal device to execute:

a transmission control instruction of transmitting image data from the communication unit of the communication terminal device to a counter party device, the image data corresponding to an image captured by a camera of the communication terminal device, the communication unit being connected to the network, the counter party device participating in the teleconference via a teleconferencing application being executed in the counter party device;

an acquisition instruction of acquiring an image display setting indicating whether the captured image corresponding to the image data transmitted to the counter party device is displayed by the teleconferencing application executed in the counter party device according to transmission of the image data by the transmission control instruction, the image display setting being transmitted from the counter party device by the teleconferencing application executed in the counter party device;

a first determination instruction of determining whether a state of the captured image is in a first state or a second state;

a second determination instruction of determining whether the captured image is displayed by the teleconferencing application executed in the counter party device based on the image display setting; and an output control instruction of:

outputting notification information from the notification unit of the communication terminal device in a first case in which the determination instruction determines that the captured image is in the first state and the second determination instruction determines that the captured image is displayed by the teleconferencing application executed in the counter party device; and not outputting the notification information from the notification unit in a second case in which the first determination instruction determines that the captured image is in the second state and the second determination instruction determines that the captured image is not displayed by the teleconferencing application executed in the counter party device.

15. A teleconferencing method executed in a communication terminal device used for teleconference through a network, the communication terminal including a communication unit and a notification unit, the method comprising:

transmitting image data from the communication unit to a counter party device, the image data corresponding to an image captured by a camera of the communication terminal device, the communication unit being connected to the network, the counter party device participating in the teleconference via a teleconferencing application being executed in the counter party device;

acquiring an image display setting indicating whether the captured image corresponding to the image data transmitted to the counter party device is displayed by the teleconferencing application executed in the counter party device according to the transmitting of the image data, the image display setting being transmitted from the counter party device by the teleconferencing application executed in the counter party device;

determining whether a state of the captured image is in a first state or a second state;

determining whether the captured image is displayed by the teleconferencing application executed in the counter party device based on the image display setting; and outputting notification information from the notification unit of the communication terminal device in a first case in which it is determined that the captured image is in a first state and it is determined that the captured image is displayed by the teleconferencing application executed in the counter party device; and not outputting the notification information from the notification unit in a second case in which it is determined that the captured image is in a second state and it is determined that the captured image is not displayed by the teleconferencing application executed in the counter party device.

* * * * *